United States Patent [19]
Jerman et al.

[11] Patent Number: 5,998,906
[45] Date of Patent: Dec. 7, 1999

[54] ELECTROSTATIC MICROACTUATOR AND METHOD FOR USE THEREOF

[75] Inventors: John H. Jerman, Palo Alto; John D. Grade; Joseph D. Drake, both of Mountain View, all of Calif.

[73] Assignee: Seagate Technology, Inc., Scotts Valley, Calif.

[21] Appl. No.: 09/135,158

[22] Filed: Aug. 17, 1998

Related U.S. Application Data

[60] Provisional application No. 60/071,038, Jan. 13, 1998.

[51] Int. Cl.$^6$ ................................................. H02N 1/00
[52] U.S. Cl. ...................................... 310/309; 361/283.3
[58] Field of Search ........................ 310/309; 361/283.3; 318/116

[56] References Cited

U.S. PATENT DOCUMENTS

| | | | |
|---|---|---|---|
| 4,239,330 | 12/1980 | Ashkin et al. | 350/96.18 |
| 4,265,513 | 5/1981 | Matsushita et al. | 350/96.2 |
| 4,304,460 | 12/1981 | Tanaka et al. | 350/96.16 |
| 4,322,126 | 3/1982 | Minowa et al. | 350/96.2 |
| 4,498,730 | 2/1985 | Tanaka et al. | 350/96.16 |
| 4,626,066 | 12/1986 | Levinson et al. | 350/96.18 |
| 4,674,319 | 6/1987 | Muller et al. | 73/23 |
| 4,740,410 | 4/1988 | Muller et al. | 428/133 |
| 4,805,456 | 2/1989 | Howe et al. | 73/517 AV |

(List continued on next page.)

OTHER PUBLICATIONS

Field, L.A., et al., "Micromachined 1X2 Optical Fiber Switch", The 8th International Conference on Solid–State Sensors and Actuators, and Eurosensors IX, Stockholm, Sweden, Jun. 25–29, 1995, pp. 344–347.

Hirano, Toshiki, et al, "Invar MEMS Milliactuator for Hard Disk Drive Applications", IEEE, Jan. 1998, pp. 378–382.

Horsley, D. A., et al., "Angular Micropositioner for Disk Drives", IEEE, Jan. 1997, pp. 454–459.

Jaecklin, V.P., et al., "Optical Microshutters and Torsional Micromirrors for Light Modulator Arrays", Proceedings IEEE Micro Electrical Mechanical Systems, Fort Lauderdale, Florida, Feb. 7–10, 1993, pp. 124–127.

Klassen, E. H., et al., "Silicon Fusion Bonding and Deep Reactive Ion Etching; A New Technology for Microstructures", The 8th International Conference on Solid–State Sensors and Actuators, and Eurosensors IX, Stockholm, Sweden, Jun. 25–29, 1995, pp. 556–559.

Legtenberg, Rob, et al., "Comb–drive actuators for large displacements", J. Micromech. Microeng. 6 (1996), pp. 320–329. (month unknown).

Mohr, J., et al., "Micro Optical Switching by Electrostatic Linear Actuators with Large Displacements", The 7th International Conference on Solid–State Sensors and Actuators, Yokohama, Japan, 1993, pp. 120–123. (month unknown).

(List continued on next page.)

*Primary Examiner*—Nestor Ramirez
*Assistant Examiner*—Judson H. Jones
*Attorney, Agent, or Firm*—Flehr Hohbach Test Albritton & Herbert LLP

[57] ABSTRACT

An electrostatic microactuator comprising a substrate and at least one comb drive assembly having first and second comb drive members. Each of the first and second comb drive members is provided with comb drive fingers. The first comb drive member is mounted on the substrate. The at least one comb drive assembly is disposed between the first and second spaced-apart, beam-like spring members. The second comb drive member overlies the substrate. Each of the first and second beam-like members have a first end portion secured to the substrate and a second end portion secured to the second comb drive member for suspending the second comb drive member over the substrate. The second comb drive member is movable between a first position in which the comb drive fingers of the first and second comb drive members are spaced apart and a second position in which the comb drive fingers of the first and second comb drive members are interdigitated.

27 Claims, 18 Drawing Sheets

5,998,906
Page 2

U.S. PATENT DOCUMENTS

| | | | |
|---|---|---|---|
| 4,896,937 | 1/1990 | Kraetsch et al. | 350/96.2 |
| 4,943,750 | 7/1990 | Howe et al. | 310/309 |
| 5,000,532 | 3/1991 | Kraetsch et al. | 350/96.2 |
| 5,024,500 | 6/1991 | Stanley et al. | 350/96.15 |
| 5,025,346 | 6/1991 | Tang et al. | 361/283 |
| 5,043,043 | 8/1991 | Howe et al. | 156/645 |
| 5,208,880 | 5/1993 | Riza et al. | 385/18 |
| 5,260,928 | 11/1993 | Lee et al. | 369/112 |
| 5,327,416 | 7/1994 | Lee et al. | 369/199 |
| 5,446,811 | 8/1995 | Field et al. | 385/23 |
| 5,450,751 | 9/1995 | Putty et al. | 73/504.18 |
| 5,452,283 | 9/1995 | Lee et al. | 369/112 |
| 5,493,440 | 2/1996 | Souda et al. | 359/341 |
| 5,532,884 | 7/1996 | Lee et al. | 359/833 |
| 5,563,466 | 10/1996 | Rennex et al. | 310/309 |
| 5,646,928 | 7/1997 | Wu et al. | 369/112 |
| 5,647,030 | 7/1997 | Jorgenson et al. | 385/12 |
| 5,753,911 | 5/1998 | Yasuda et al. | 250/306 |
| 5,760,998 | 6/1998 | Berberich et al. | 360/97.02 |

OTHER PUBLICATIONS

Obermeier, E., "Design and Fabrication of an Electrostatically Driven Micro–Shutter", The 7th International Conference on Solid–State Sensors and Actuators, Yokohama, Japan, 1993, pp. 132–135. (month unknown).

Tang, William C., "Laterally Driven Polysilicon Resonant Microstructures", *Sensors Actuators* 20, 1989, pp. 25–31 (IEEE reprint pp. 53–59), (month unknown).

Wenk. B., et al., "Thick polysilicon based surface micromachined capacitive accelerometer with force feedback operation", SPIE vol. 2642, Oct. 1995, pp. 84–94.

Yasseen, A.A., et al.; "A Rotary Electrostatic Micromotor 1x8 Optical Switch", IEEE, 1998, pp. 116–120, (month unknown).

— NEUTRAL STABILITY
-- SINGLE SIDE DRIVE

— REQUIRED CLAMP FORCE
-- PARALLEL PLATE CLAMP

ELECTROSTATIC MICROACTUATOR AND METHOD FOR USE THEREOF

CROSS-REFERENCE TO RELATED APPLICATION

The application claims priority to U.S. provisional patent application Ser. No. 60/071,038 filed Jan. 13, 1998.

SCOPE OF THE INVENTION

The present invention relates generally to electrostatic microactuators and more particularly to linear electrostatic actuators with comb drive assemblies.

BACKGROUND

Microstructures fabricated using silicon integrated circuit processing techniques have been developed for a wide variety of sensing and actuation applications. Compared to conventional prior art implementations in these and other applications, micro-structures provide advantages in cost, reliability, and performance. Micro-machined pressure sensors is and accelerometers are now being manufactured in quantities of over 10 million per year for a variety of uses in the medical, automotive, industrial, and instrumentation fields.

However, existing microstructures are not practical for use in certain applications due to difficulties in achieving large forces and displacements from these small devices. Some developers have circumvented this problem by attaching external, conventional actuators such as solenoids, piezoelectric elements, or pneumatic sources to microstructures to provide the needed force or displacement. These external actuators are unattractive due to their large size, critical alignment, and large power requirements. Integrated actuators, that is, microstructures where the actuator is fabricated simultaneously with the mechanical structure, are advantageous from the standpoint of cost, reliability, and ease in assembly.

Various actuation methods have been used for integrated actuators for microstructures including electrostatic, electromagnetic, thermal and thermo-pneumatic. The thermal techniques tend to provide large force but with relatively slow response times. Electromagnetic techniques are complicated by the difficulty in providing coils with a sufficient number of turns in a planar structure and the high power dissipation caused by the high currents needed to produce the desired magnetic field. Electrostatic actuation becomes attractive on a small size scale because the forces increase as the gap between elements decrease. The power dissipated by electrostatic elements tends to be low and the operating speed is usually limited only by the mechanical response of the structure.

The driving forces in prior art electrostatic actuators have been typically created using only one of two types of driving electrodes: so-called comb drive fingers or parallel plates. Parallel plate capacitors generate a force that is proportional to the square of the drive voltage and inversely proportional to the square of the gap between the plates. This behavior limits the useful range of motion for such an actuator, as at large gaps the electrostatic force is unable to overcome the restoring spring force of the actuator supports, and at gaps less than about ⅔ of the initial gap, the actuator becomes unstable when the electrostatic force overwhelms the linear restoring force. For practical microstructure elements, the useful range of motion for parallel plate actuators is less than 10 microns. Comb drive actuators, such as described in U.S. Pat. No. 5,025,346, feature a series of interdigitated electrodes whose capacitance may be used to provide a motive force that is relatively constant over a range of motion roughly equal to the length of the comb fingers, which can be made greater than 100 microns. The force available from each finger is relatively small, so that practical comb drive actuators typically have between 10 and 200 fingers to produce adequate force for a microstructure device.

A serious difficulty with prior art comb drive devices is that the maximum motion of the device is limited by so-called electromechanical side instability. In the ideal case, the side forces on each finger are exactly balanced, however if the finger is not constrained to move down the precise center of the gap, a side force will be generated by the electrodes. While the forward motive force is nearly constant with incremental deflection, the side force increases rapidly with side deflection. The instability occurs when the derivative of the side force with respect to side displacement is larger than the lateral mechanical spring constant. If this derivative exceeds the side spring constant of the motor support structure, the comb drive will snap to the side, shorting out the drive electrodes and disrupting the forward motion of the actuator. This behavior for prior art devices is described in a paper entitled "Comb-drive actuators for large displacements" by Legtenberg, Groeneveld, and Elwenspoek, in J. Micromech. Microeng. 6 (1996) pages 320–329. Their designs have a maximum displacement of about 40 microns. The design techniques in the Legtenberg paper describe the maximum displacement for conventional comb drive actuators, but do not describe designs with substantially larger deflections.

The early comb drive actuators used thin polysilicon layers provided by the so-called surface micro-machining process to fabricate the comb fingers and the moveable, laterally-driven element. This polysilicon was typically 1–2 microns thick. Since the lateral feature size of these devices was comparable to the material thickness, the stiffness of the parts to out-of-plane deflections was very low. The advent of Deep Reactive Ion Etching (DRIE) has allowed similar structures to be fabricated in single crystal silicon with typical thicknesses of 100 microns. DRIE is described in a paper entitled, "Silicon Fusion Bonding And Deep Reactive Ion Etching; A New Technology For Microstructures" by Klassen, Petersen, Noworolski, Logan, Maluf, Brown, Storment, McCully, and Kovacs, in the Proceedings Of Transducers '95 (1995), pages 556–559. These thicker structures can provide larger vertical electrode areas and substantially higher stiffnesses out of the plane of deflection. Recently, other fabrication techniques, including thicker surface micro-machined polysilicon or plated metal structures made in photolithographically defined molds have been used to increase the thickness and thus the out-of-plane stiffness of comb drive structures. None of these fabrication techniques by themselves have been used to improve the limited deflection of prior art comb drive structures.

What is needed, therefore, is an improvement in the range of deflection and characteristics of prior art comb drive actuators.

Another object of the invention is to provide an electrostatic microactuator of the above character in which side instability forces in the comb drive assembly are minimized.

Another object of the invention is to provide an electrostatic microactuator of the above character in which means for attaching or coupling the actuator to external devices is provided.

Another object of the invention is to provide an electrostatic microactuator of the above character in which the resonant characteristics of the comb drive assembly are utilized to achieve large deflections.

SUMMARY OF THE INVENTION

The present invention provides large deflection microactuators for use in devices such as optical switches and the like. The actuators provide improvements in the design of the suspension, comb drive elements, dynamic electrical drive control, positive position stops and position sensing. The actuators may be used in an optical switch or in a variety of other applications, for example: lateral resonators, force-balanced accelerometers, or miniature grippers. High out of plane stiffness and a larger electrode area create a microstructure that generates large forces and displacements.

BRIEF DESCRIPTION OF THE DRAWINGS

The accompanying drawings, which are somewhat schematic in many instances and are incorporated in and form a part of this specification, illustrate several embodiments of the invention and, together with the description, serve to explain the principles of the invention.

DESCRIPTION OF THE INVENTION

Figure 1:
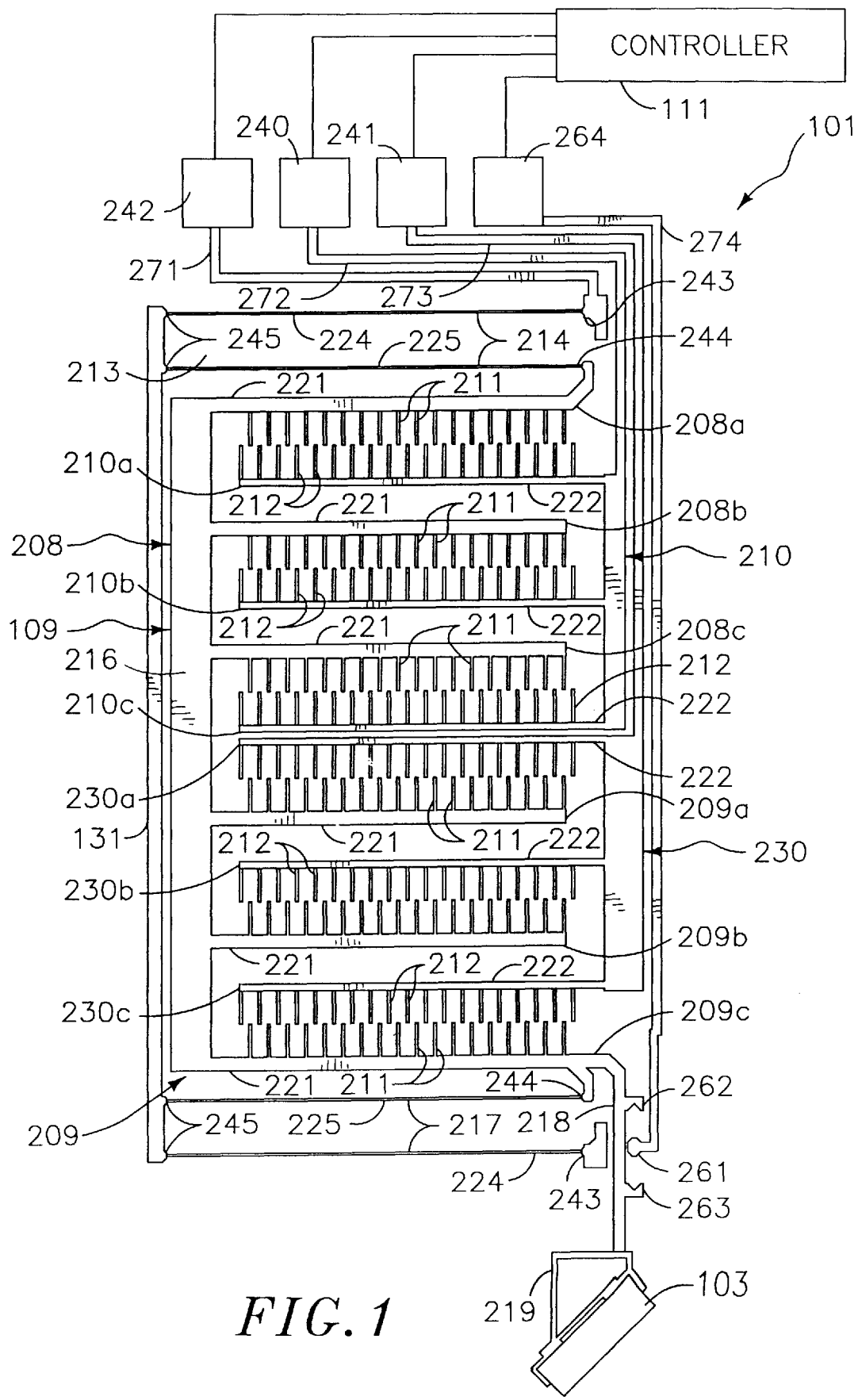
FIG. 1 is an enlarged plan view of an electrostatic microactuator of the present invention.

The microactuators of the present invention may be utilized to translate optical mirrors in optical switches such as generally shown in optical microswitch 1301 below and more specifically disclosed in copending U.S. patent application Ser. No. 09/135,236 filed Aug. 17, 1998 (A-66163), the entire contents of which are incorporated herein by this reference. Each of the microactuators in such a microswitch or other application includes at least one pair of opposed comb drive members to provide motive force for the actuator. A somewhat simplified version of a lateral comb drive actuator or microactuator 101 of the present invention is illustrated in FIG. 1 which represents a top plan view of the actuator 101. Shuttle 109 of the actuator 101 overlies substrate 213 and includes first and second movable electrode assemblies 208,209 which are joined together so as to move together in unison. Actuator 101 further includes and first and second separate fixed assemblies 210,230. The assemblies extend perpendicularly to the longitudinal centerline of the actuator 101 and are centered on such centerline. First movable assembly 208 comprises first, second, and third comb drive members 208a, 208b, 208c each of which extends perpendicularly to the direction of travel of the assemblies 208,209. Second movable assembly 209 comprises first, second, and third comb drive members 209a, 209b, 209c each of which extends perpendicularly to the direction of travel of the assemblies 208,209. Actuator 101 and movable assemblies 208,209 and fixed assemblies 210,230 thereof are made from a silicon wafer by any suitable means such as by DRIE in which a thin, single-crystal silicon layer, fusion bonded to substrate 213 in certain areas, is etched to form movable assemblies 208,209 and fixed assemblies 210,230. The single-crystal silicon layer is electrically isolated from the substrate 213 by a thick silicon dioxide layer. As such, movable electrode assemblies 208,209 are electrically isolated from fixed electrode assemblies 210,230. Alternative fabrication techniques include high aspect ratio plating of metallic structures on an insulating substrate over localized sacrificial layers. Such a process is described in U.S. Pat. No. 5,450,751 titled "Microstructure For Vibratory Gyroscope" by Putty and Eddy. The resulting structures include relatively narrow and tall suspended spring structures, fixed attachment points to a substrate, and the ability to make electrical connections to the structures. Alternatively, the desired structures can be fabricated by the deposition, patterning, and etching of a relatively thick layer of for example polysilicon over localized sacrificial layers of for example doped silicon dioxide. An example of such a process is described in "Thick Polysilicon Based Surface Micromachined Capacitive Accelerometer with Force Feedback Operation" by B. Wenk, et al., in the SPIE Proceedings, Volume 2642 titled "Micromachined Devices and Components," October, 1995, pp. 84–94.

Movable electrode assemblies 208,209 are interconnected by a rigid, elongate frame member or connector bar 216 which extends longitudinally in the direction of travel. First movable electrode assemblies 208 are joined to one end portion of the connector bar 216 in longitudinally spaced apart positions and second movable electrode assemblies 209 are joined to the opposite or other end portion of the connector bar 216 in longitudinally spaced apart positions. An extension 218 and a bracket member or bracket 219 are included within the attachment means of the actuator 101 for rigidly attaching mirror 103 to shuttle 109 and thus to movable electrode assemblies 208,209. The bracket 219 and thus mirror 103 are inclined at an angle to the direction of travel of shuttle 109 and movable electrode assemblies 208,209.

Each of the comb drive members 208a, 208b, 208c, 209a, 209b, 209c has a bar or beam 221 which is joined to the connector bar 216 at one end and extends perpendicularly from the bar across the actuator. Each bar 221 has a length ranging from 200 to 2000 microns, preferably ranging from 700 to 1200 microns and more preferably approximately 800 microns which defines the length of the respective comb drive member. A plurality or series of comb-like members or fingers 211 of equal length extending parallel to the direction of travel are secured to each bar 221. Fingers 211 are evenly spaced-apart along the length of each comb drive bar 221 and each have a length ranging from 5 to 200 microns, preferably ranging from 60 to 130 microns and more preferably approximately 90 microns. Fingers 211 are spaced apart a distance ranging from 3 to 25 microns, preferably ranging from 6 to 15 microns and more preferably approximately 10 microns. The comb fingers 211 of comb drive members 208a, 208b, 208c extend toward the mirror 103 coupled to the actuator, while the comb fingers 211 of the comb drive members 209a, 209b, 209c extend away from the mirror.

First fixed electrode assembly 210 comprises first, second, and third comb drive members 210a, 210b, 210c and second fixed electrode assembly 230 comprises first, second, and third comb drive members 230a, 230b, 230c each of which comb drive assembly extends perpendicularly of the direction of travel of movable electrode assemblies 208,209. Each of the comb drive members 210a, 210b, 210c, 230a, 230b, 230c has a bar or beam 222 mounted on substrate 213 and extending across the actuator 101. Each bar 222 has a length similar to the length of bar 221 which defines the length of the respective comb drive member. A plurality or series of comb-like members or fingers 212 substantially identical in size and shape to comb drive fingers 211 are secured to comb drive bar 222 in spaced-apart positions along the length of the bar 222. The comb fingers 212 of comb drive members 210a, 210b, 210c extend away from mirror 103 and oppose the comb drive fingers 211 of comb drive members 208a, 208b, 208c while the comb fingers 212 of comb drive members 230a, 230b, 230c extend toward the mirror and oppose the comb drive fingers 211 of comb drive members 209a, 209b, 209c.

Figure 2:
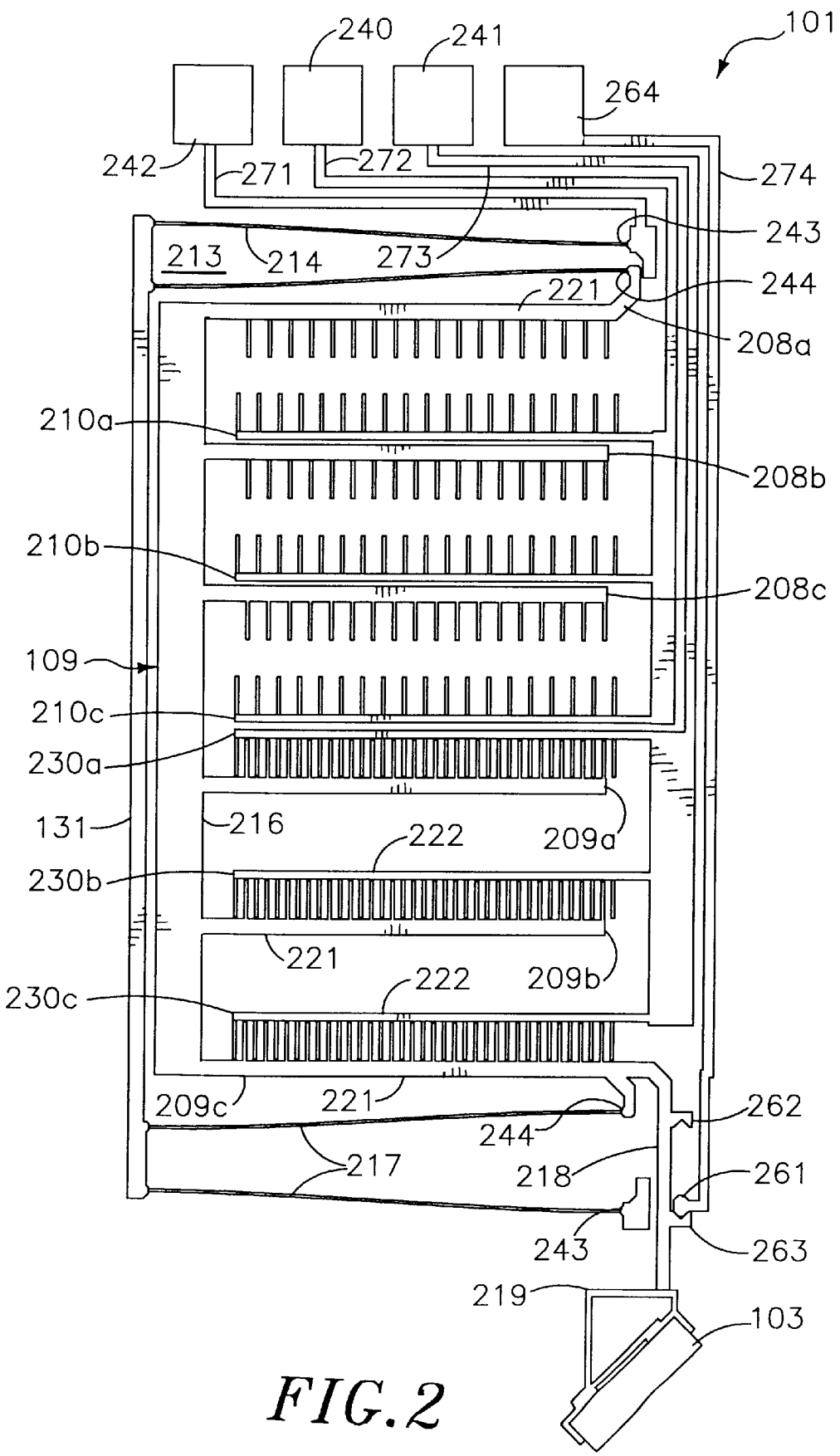
FIG. 2 is a plan view of the electrostatic microactuator of FIG. 1 in which the mirror therein is in a retracted condition.
Figure 3:
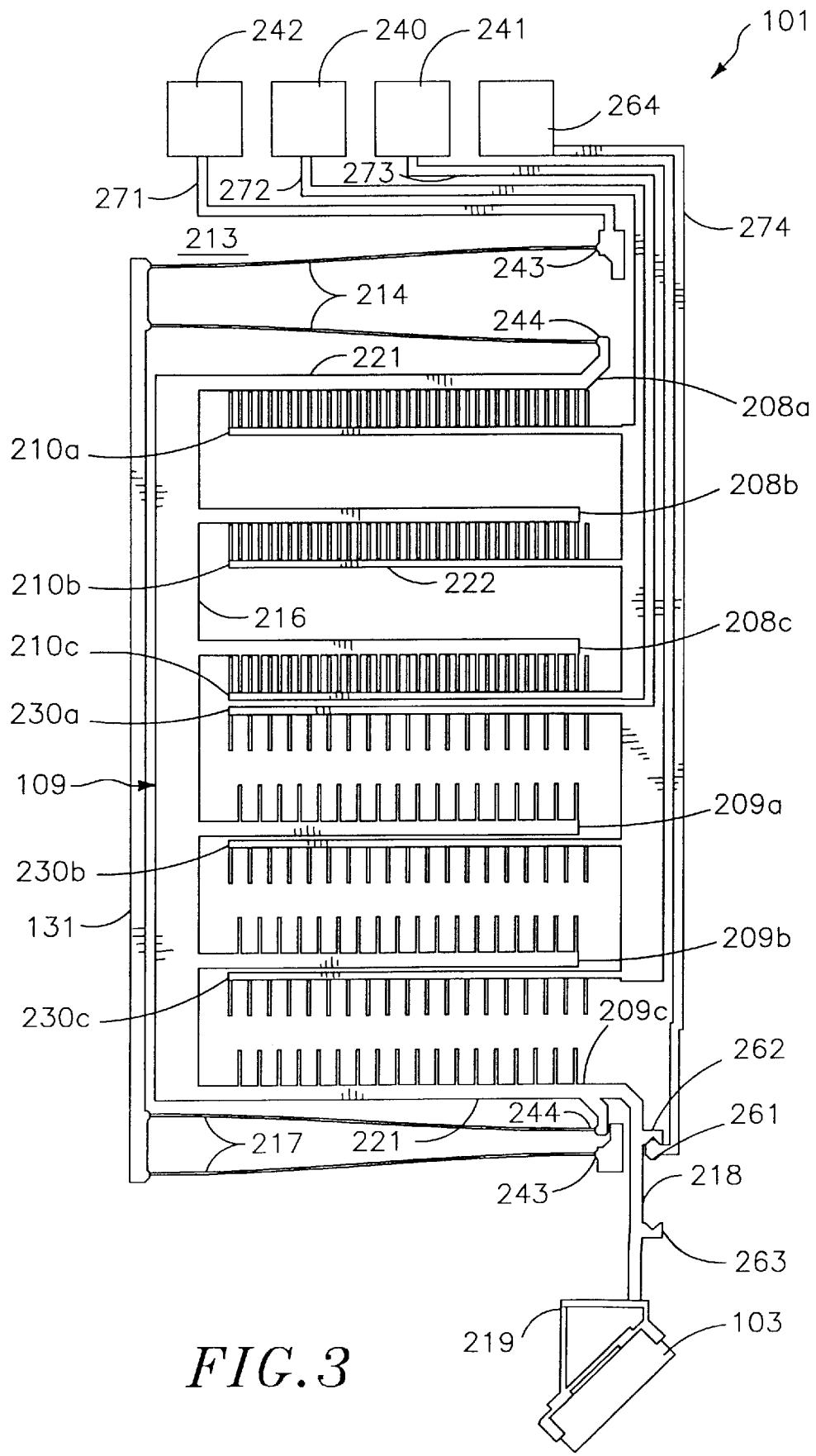
FIG. 3 is a plan view of the electrostatic microactuator of FIG. 1 in which the mirror therein is in an extended condition.

Comb drive fingers 211 are interleavably disposable within fingers 212. Each opposed set of comb drive members of actuator 101 form an electrostatically-driven comb drive means or assembly. The comb drive members 208a, 208b, 208c, 209a, 209b and 209c of each such comb drive assembly are movable relative to respective comb drive members 210a, 210b, 210c, 230a, 230b and 230c between a first position, as shown in FIG. 2 with respect to comb drive members 208a,210a,208b,210b and 208c,210c, in which the respective comb drive fingers are spaced apart from each other, to a second position, as shown in FIG. 1 with respect to comb drive members 208a,210a, 208b,210b, 208c,210c, 209a,230a, 209b,230b and 209c,230c, in which the comb drive fingers 211,212 are not interdigitated but nonetheless in electrostatic engagement when a voltage potential is applied therebetween, and to a third position, as shown in FIG. 3 with respect to comb drive members 208a,210a, 208b,210b and 208c,210c, in which the respective comb drive fingers are both interdigitated with respect to each other and in electrostatic engagement. The free ends of the comb drive fingers 211,212 end substantially along a line extending perpendicular to the direction of travel of shuttle 109 when the opposed comb drive members are in the second position. The spacing between the fingers 211,212 is chosen to ensure lateral stability over the full range of deflection at the largest allowed driving voltage for the actuator 101.

The fixed assemblies 210,230 are each fixedly attached to substrate 213 and are used to drive the first and second movable electrode assemblies 208,209 between a first or retracted position, shown in FIG. 2 in which first comb drive members 208,210 are in a spaced apart position and second comb drive members 209,230 are in an interdigitated position, and a second or extended position, shown in FIG. 3 in which first comb drive members 208,210 are in an interdigitated position and second comb drive members 209,230 are in a spaced apart position.

Shuttle 109 and movable electrodes assemblies 208,209 are suspended over the substrate 213 by a set of springs or folded cantilever beams 214,217 disposed at each end of the electrode assemblies 208,209. Spring 214 is spaced apart from first comb drive member 208a at one end of actuator 101 and spring 217 is spaced apart from second comb drive member 209c at the opposite other end of actuator 101. Each set of springs 214,217 includes first and second spaced-apart spring portions 224,225 which extend perpendicularly of the direction of travel when in a relaxed position and are joined at one end by a folded portion 245 (see FIG. 1). The spring portions or beams 224,225 extend, in a spaced apart relationship, along substantially the entire length of comb drive bars 221,222 and are parallel to the comb drive bars. The spring portions 224,225 each have an identical cross section, which is substantially rectangular. One end of rigid support or elongate support bar 131 is joined to the folded portion 245 of each of springs 214,217. First ends 243 of each of springs 214,217 are joined to substrate 213 while second ends 244 of the springs 214,217 are joined to the respective ends of comb drive bars 221 for comb drive members 208a,209b opposite connector bar 216.

The suspended portion of actuator 101, which is designed using high aspect ratio techniques and includes movable electrode assemblies 208,209, shuttle 109, springs 214,217 and rigid support 131, has a height, measured out of the plane of substrate 213, ranging from 20 to 300 microns, preferably ranging from 60 to 150 microns and more preferably approximately 80 microns.

Electrical connector means are included in actuator 101 for permitting a controller 111 to be electrically coupled to movable electrode assemblies 208,209 and fixed electrode assemblies 210,230. Specifically, electrical connector means in the form of electrical pads 240,241,242 are provided. Electrical pad 242 is electrically coupled to first and second movable electrode assemblies 208,209 by lead means in the form of lead or trace 271. Electrical pads 240,241 are electrically coupled to first fixed electrode assembly 210 and second fixed electrode assembly 230 by respective lead means in the form of leads or traces 272,273.

In the present invention, the springs preferably exhibit a high ratio of lateral to forward spring constant. In the prior art this is accomplished by using four opposing springs, or folded cantilever beams, disposed at four corners of a symmetrical movable electrode portion (see FIG. 1 in U.S. Pat. No. 5,025,346). However, in this prior art design, as the movable electrode portion is deflected, the lateral stiffness of the springs decreases dramatically.

The present invention identifies that the bilateral symmetry and four springs of the prior art actuator designs are not required. In contrast, the present invention includes only the two springs or folded cantilever beams 214,217, which are coupled at first ends 243 to the substrate 213 and at second ends 244 to the movable electrode assemblies 208,209. The springs are connected at their folded portions 245 by a suspended rigid support 131 extending therebetween. The aforementioned structures are designed to be fabricated using high aspect ratio techniques such as DRIE, permitting them to be designed with a taller height or profile than the prior art. The significantly larger height and the rectangular cross section of spring portions 224,225 enable springs 214,217 to exhibit increased out-of-plane stiffness, that is stiffness out of the plane of substrate 213, over that of the prior art. Such out-of-plane stiffness serves to inhibit undesirable bending of movable electrode assemblies 208,209 out of the plane of fixed electrode assemblies 210,230, despite the movable electrode assemblies being anchored to substrate 213 only at ends 243 of springs 214,217.

Actuator 101 has means for restricting the forward and rearward movement of shuttle and for permitting controller 111 to monitor the position of shuttle 109 and specifically to monitor whether the shuttle is in its fully retracted position shown in FIG. 2 or fully extended position shown in FIG. 3. A mechanical stop 261 is rigidly formed on substrate and is disposed between a first or forward limiter 262 and a second or rearward limiter 263 provided on extension 218. The forward movement of shuttle 109 is restricted by the engagement of stop 261 with forward limiter 262 and the rearward movement of the shuttle 109 is restricted by the engagement of the stop with rearward limiter 263. Stop 261 is electrically connected by means of a lead or trace 274 formed on substrate 213 to an electrical pad 264 also formed on the substrate 213. Pad 264 permits stop 261 to be electrically coupled to controller 111. The engagement of stop 261 with one of limiters 262 or 263 closes an electrical circuit between pad 264 and pad 242.

In one method of operating the actuator 101 of the present invention, a voltage relative to a potential applied to the electrical pad 242 may selectively applied by controller 111 through a set of respective electrical pads 240 or 241 in actuator 101 to the comb fingers 212 of the fixed electrode assembly 219 or 230 to statically deflect the movable electrode assemblies 208,209 and therefore the extension 218 and associated mirror 103 of the actuator 101 between the retracted position shown in FIG. 2 and the extended position shown in FIG. 3. The electrostatic attraction force between the engaging comb drive members is approximately constant through interdigitation.

The extended condition may be achieved in the actuator 101 by releasing the constant voltage on the fixed electrode assembly 230 so that the mirror 103 swings towards the extended position against forward limiter 262. The mirror 103 is held in the extended position 293 by thereafter applying a constant voltage to the other fixed electrode assembly 210. Subsequently, the mirror 103 may be retracted by removing the constant voltage on the fixed electrode assembly 210 and by reapplying the fixed voltage to the fixed electrode assembly 230.

During each half-stroke of shuttle 109, the shuttle is first pulled by springs 214,217 from its deflected position back to its relaxed position, shown in FIG. 1, and thereafter pulled by the cooperative electrostatic engagement between either electrode assemblies 208,210 or 209,230 to its other deflected position.

The performance of the lateral comb actuator 101 depends on a number of factors including: the forward and side stiffness of the springs 214,217 and the relative dimensions of the comb drive fingers 211,212. A performance trade-off exists between the allowed operating voltage and the size of the actuator 101 and the resulting displacement and switching speed of the mirror 103. The traditional method for achieving large deflections with low operating voltages has been to minimize the spacing between electrodes to generate the largest forward force and use springs with a low forward stiffness to produce a large forward displacement. This approach is commonly used for thin polysilicon actuators where the low out of plane stiffness prevents the use of large operating voltages. However, these designs are not optimal when relatively thicker structures are used. Although the forward force per finger is increased when the spacing between electrodes is reduced, the lateral forces increase faster. When designing a high speed actuator for either large deflection or high force, the preferred design approach is to determine the maximum voltage that can be supported by the structure and then choose an electrode spacing that results in the minimum lateral instability at that maximum voltage. The maximum displacement and speed of the actuator are then defined by the spring stiffness and the mass of the moving elements.

The present invention addresses the aforementioned concerns while also minimizing the size of the actuator and thus the space occupied by actuators on the optical switch or other application device. In the prior art, the comb fingers are not sufficiently constrained to prevent movement parallel relative to the central axis of the switch, that is perpendicular to the direction of travel of the actuator 101, such that a sufficient side force generated between the fingers causes the movable electrode assembly to snap towards a side rather than continue towards the extended or retracted position. This instability occurs when the derivative of the side force with respect to side displacement is larger than the lateral mechanical spring constant of the springs.

Spring portions or beam-like members 224,225 can be longer or shorter than comb drive bars 221,222. More specifically, spring portions 224,225 have a length ranging from 200 to 2000 microns and preferably ranging from 800 to 1200 microns and a width ranging from 3.5 to 5.5 microns and preferably ranging from 3.75 to 4.25 microns. The spring portions 224,225 shown in FIG. 1 each have a length at least equal to the length of the comb drive bars 221,222 of actuator 101. Actuator 101 has a length of approximately 800 microns, a width of approximately 2500 microns and a height of approximately 80 microns.

Beams or springs 214,217 are shown in FIG. 1 in an undeflected or relaxed position in which each of the beamlike members or beams 224,225 extends linearly in a direction perpendicular to the direction of travel of shuttle 109. Beams 224,225 are each movable in one direction of travel of electrode assembly 209 to a first deflected position, shown in FIG. 2, when the respective mirror 103 is in a retracted position. Beams 214,217 are also movable in an opposite direction of travel of electrode assembly 209 to a second deflected position, shown in FIG. 3, when the respective mirror 103 is in an extended position. The beams 214,217 are in a nonlinear or bent position when in their respective first and second deflected positions. More specifically, the opposite ends of each beam 224,225 are moved in opposite directions, each such direction being parallel to the direction of travel of shuttle 109, when the respective spring 214,217 is moved from a linear or relaxed position to a deflected or bent position. Maximum side stiffness of the beams or springs 214,217, that is stiffness in the direction perpendicular to the direction of travel of shuttle 109, occurs with the springs in their undeflected or relaxed positions shown in FIG. 1 midway between the retracted and the extended positions shown respectively in FIGS. 2 and 3. As can be seen, springs 214,217 are in a linear condition when undeflected as in FIG. 1.

Shuttle 109 composed of trussed frame 216 further increases the overall rigidity of the actuator 101 against lateral loads and flexure and reduces the total mass of shuttle 109. The inherent stiffness of the present invention eliminates the need for designing the actuator 101 with bilateral symmetry as used in the prior art, permitting the width of the actuator 101 to be reduced nearly by half. With a reduced width, the set of actuators 101 may be packed more closely together in a microswitch of the type disclosed in copending U.S. patent application Ser. No. 09/135,236 filed Aug. 17, 1998 (A-66163) so as to allow a greater number of actuators in the microswitch over a given length of a laser beam.

Figure 4:
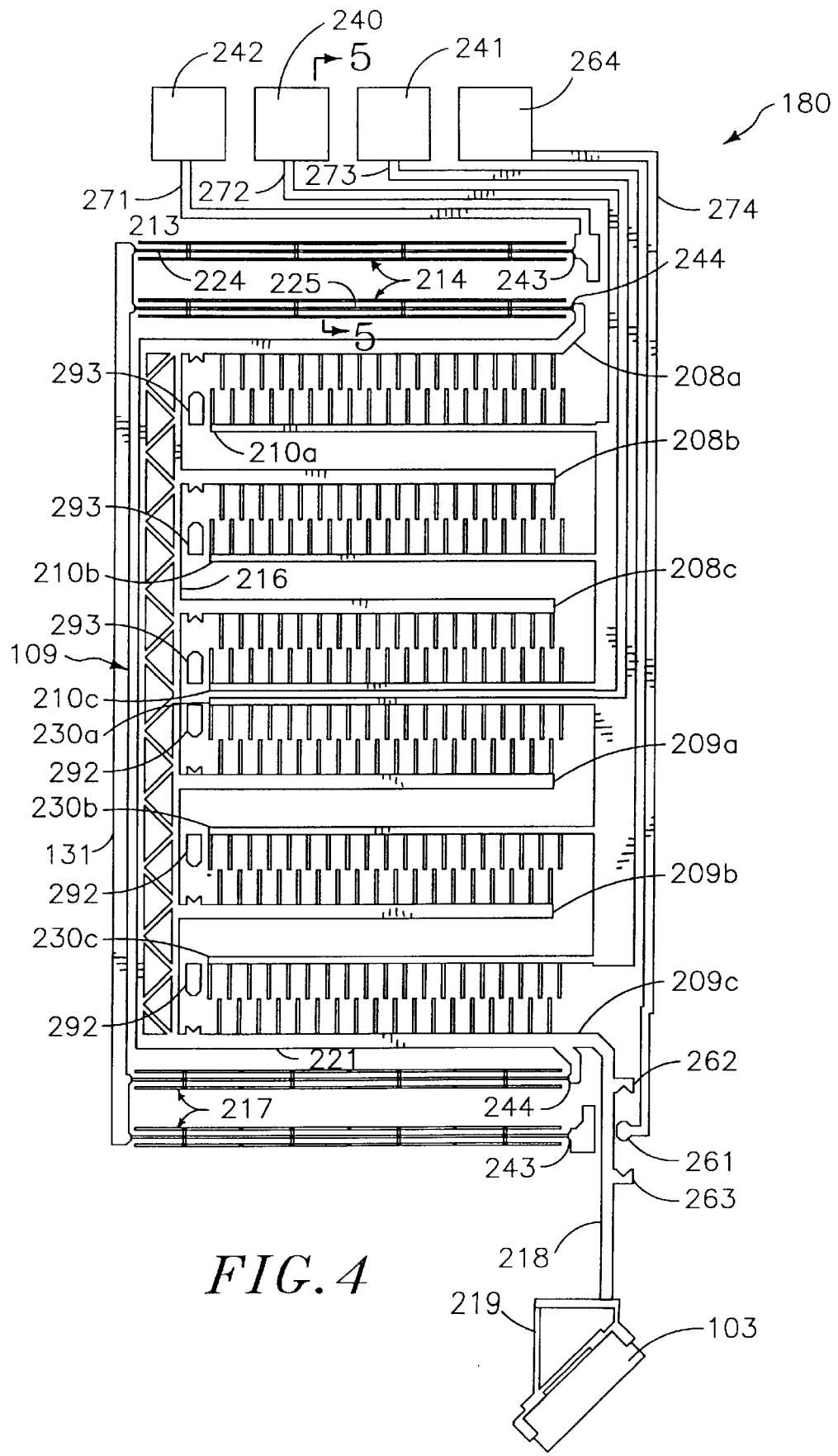
FIG. 4 is a plan view of another embodiment of an electrostatic microactuator of the present invention.

A further embodiment of the actuator of the present invention including additional features to improve the performance of the actuator is shown in FIG. 4. Like reference numerals have been used to describe like components in actuator 101 and actuator 180 of FIG. 4. Actuator 180 includes first and second sacrificial bars 246 and 247, shown in FIGS. 4 and 5 with respect to spring 214, provided alongside each spring or beam portion 224,225 to ensure even etching and thus the desired rectangular cross-section of the beam portions. Each of the sacrificial bars has a height approximating the height of the adjoining beam portion and provides a narrow slot 248 along each side of the beam portion. The spacing between the beam portion and the respective sacrificial bars, that is the width of each slot 248, is comparable to the smallest etched feature in the device. In actuator 180, the spacing between the beam portion and each of the sacrificial bars is approximately eight microns. The sacrificial bars 246,247 facilitate formation of parallel, planar side surfaces 226,227 by limiting retrograde etching of the side surfaces 226,227. More specifically, the narrow width of slots 248 inhibits ions other than those traveling in a direction parallel to the slot from entering the slot and thus participating in the etch of side surfaces 226,227.

In an exemplary method of operation of the actuator 180, the first and second movable electrode assemblies 208,209 of the actuator 101 are initially static and midway between an extended and retracted position as shown in FIG. 4. In the extended position, the extension 218 abuts forward limiter 262 and first and second movable electrode assemblies 208,209 abut against at least one and as shown in FIG. 4 a plurality of three first fixed stops 293 attached to substrate 213. A stop 293 is provided for each of comb drive members 208a, 208b, and 208c. The stop 261 engages forward limiter 261 attached to extension 218. In a retracted position, the extension 218 abuts rearward limiter 263 and first and second movable electrode assemblies 208,209 abut against at least one and as shown in FIG. 4 a plurality of three second fixed stops 292 attached to the substrate 213. A stop 292 is provided for each of comb drive members 209a, 209b, 209c. The stop 261 engages rearward limiter 263 attached to extension 218. The stops 292,293 facilitate repeatability in the position of mirror 103 and any optical microswitch or other device into which one or more actuators 180 are provided.

Figure 5:
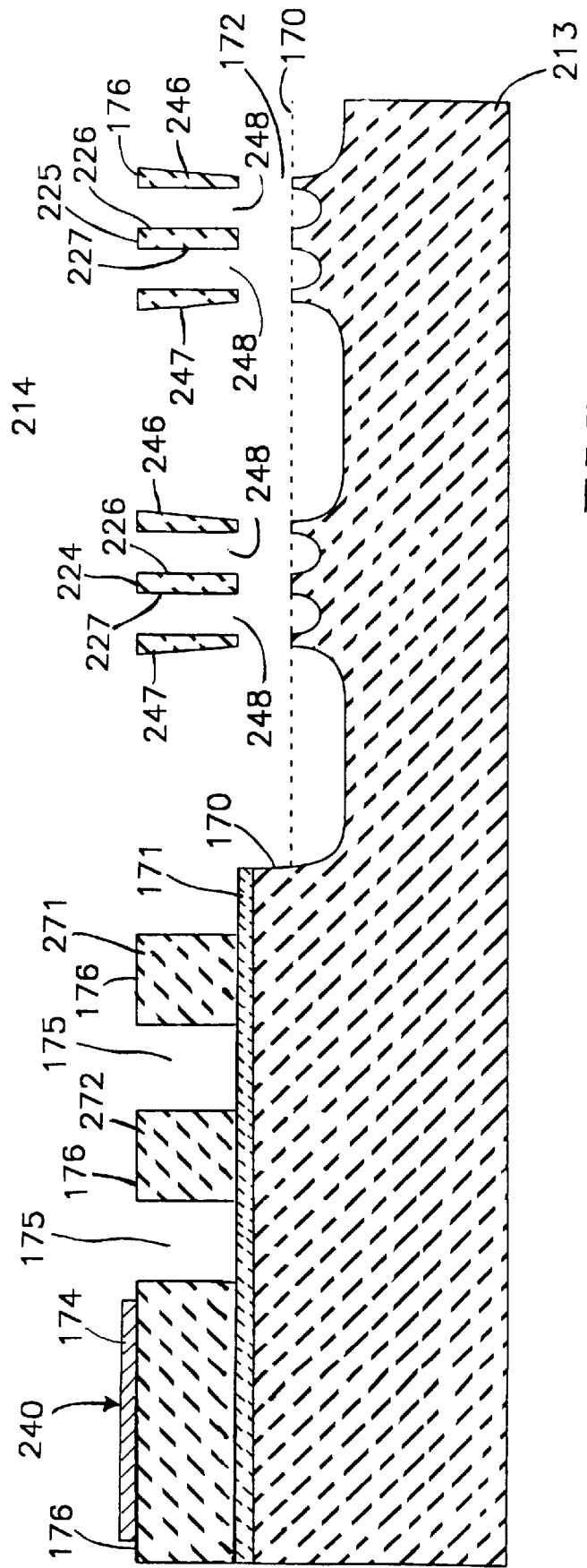
FIG. 5 is a cross-sectional drawing of the electrostatic microactuator of FIG. 4 taken along the line 5—5 of FIG. 4.

The actuators 101 and 180 may be fabricated using a process similar to that described in a paper entitled, "Silicon Fusion Bonding And Deep Reactive Ion Etching; A New Technology For Microstructures" by Klassen, Petersen, Noworolski, Logan, Maluf, Brown, Storment, McCully, and Kovacs, in the Proceedings Of Transducers '95 (1995), pages 556–559 in which shallow cavities in a bottom silicon wafer or substrate 213 allow for the creation of suspended or movable springs 214,217, comb drive members 208,209 and the like. As shown in FIG. 5, shallow depressions 170 having a depth between 5 and 50 microns and more preferably 10 microns are etched in the bottom wafer or substrate 213 in areas where moving structures are desired. A second or top wafer 173 is fusion bonded to the substrate 213 using a silicon dioxide layer 171 between 0.1 and 2.0 microns thick and more preferably approximately 1.0 microns thick. The top wafer 173 may then be lapped and polished to a desired thickness. A metal layer 174 is created on the top surface 176 of the top wafer for use in electrical pads 240, 241, 242, 264, visual indicators, and the like. Finally the top wafer 173 is etched using deep reactive ion etching techniques to achieve the desired high aspect ratio structures. The final DRIE silicon etch terminates on the silicon dioxide layer 171 where present and continues etching into the substrate 213 where layer 171 is absent. This process creates movable single-crystal silicon structures such as springs 214,217, movable electrode assemblies 208,209, rigid support 131 and connector truss 216 that are suspended above the substrate 213 and electrically isolated from the substrate by an air gap 172 having the thickness of the shallow cavity 170. Additional structures such as lead means 286,287 and stops 292,292 are fixedly attached to substrate 213 but electrically isolated from the substrate by the silicon dioxide layer 171 and from surrounding features by air gap 175.

In some applications such as switching, independent verification of the position of the mirror 103 is important. When mirror 103 in actuator 180 is in the extended position, forward limiter 262 of the movable electrode portion 208 is in engagement and electrical contact with stop 261. The stop 261 is electrically coupled by lead 274 to electrical pad 264, which can be electrically coupled to controller 111. Similarly, when the mirror 103 is held in the retracted position, rearward limiter 263 is in engagement and electrical contact with stop 261 and thus electrically coupled by lead 274 to electrical pad 264. Thus, the position of movable electrode assembly 208, shuttle 109 and mirror 103 can be sensed electrically by controller 111 to confirm and/or monitor the state of a microswitch into which actuator 180 is incorporated. Limiters 262,263 and stops 261,292,293 are included in the travel stop means of actuator 180.

Other means for monitoring the position of shuttle 109 and movable electrode assemblies 208,209 can be provided in the actuators of the present invention. For example, controller 111 can determine the position of movable comb drive members 208a,208b,208c and 209a,209b,209c by means of a conventional algorithm included in the controller for measuring the capacitance between comb drive fingers 211 of the movable comb drive members and comb drive fingers 212 of the cooperatively interengaging stationary comb drive members 210a,210b,210c, 230a,230b,230c. For example, a signal separate from the drive signal to comb drive members can be transmitted by controller 111 to the actuator for measuring such capacitance. Such a method does not require physical contact between electrodes such as the travel stop means described above. Alternatively, the silicon material along the first and second opposite, vertical sides of one or more of the spring portions or suspensions 224,225 can be doped during formation of the actuator to create piezoresistors in the spring portions. The change in electrical resistance of the piezoresistors, corresponding to changes in the strain of suspensions 224,225 during deflection of springs 214,217, can be measured by a conventional algorithm provided in controller 111 to determine the position of the shuttle 109 and mirror 103 relative to the substrate 213 and the fixed electrode assemblies 210,230.

Actuators 101 and 180 exhibit an amplitude during dynamic oscillation at the resonant frequency that is considerably larger than the largest achievable amplitude through static deflection. In this regard, the actuators 101 and 180 are designed with a relatively high quality "Q" factor. As such, one need only perform work during each cycle equal to 1/Q the amount of work necessary for achieving resonance to maintain the oscillation amplitude thereafter. This added work per cycle compensates for energy losses incurred during such cycle. The relatively high Q can be utilized in combination with a secondary mechanism (discussed in further detail below) to drive, catch, and hold the movable electrode assemblies 208,209 at the extremes of resonant oscillation.

Figure 6:
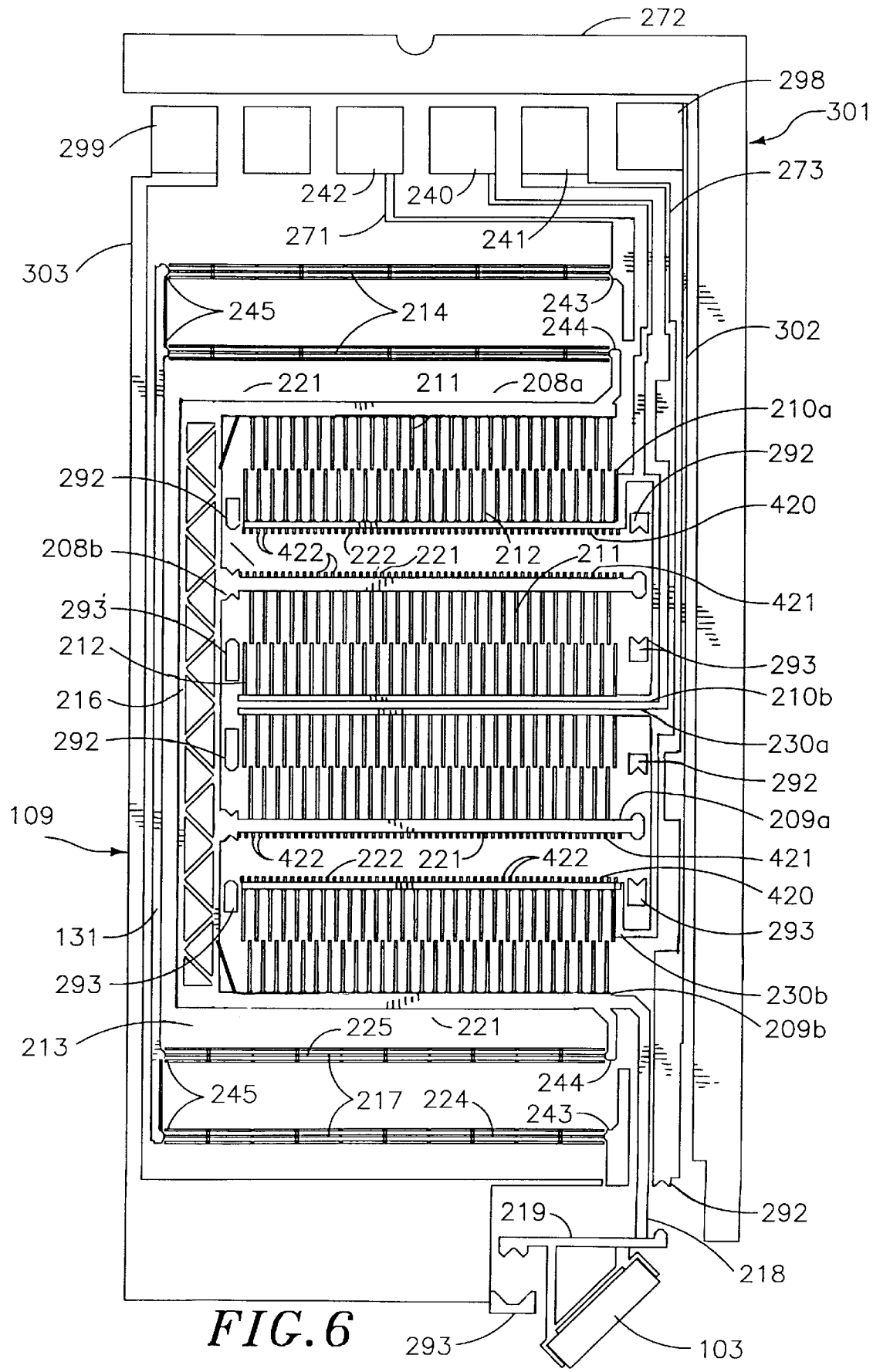
FIG. 6 is a plan view of another embodiment of an electrostatic microactuator of the present invention.

In another embodiment illustrated in FIG. 6, an actuator 301 substantially similar to actuator 180 is shown. First movable electrode assembly 208 in actuator 301 is provided with only first and second comb drive members 208a,208b and second movable electrode assembly 209 is provide only with first and second comb drive members 209a,209b. First fixed electrode assembly 210 in actuator 301 is provided with only first and second comb drive members 210a,210b and second fixed electrode assembly 230 is provide only with first and second comb drive members 230a,230b. Actuator 301 further includes two sets of elongate capacitative clamping electrodes or clamps 420 that are coupled to vertical planar surfaces of comb drive bars 222 of fixed comb drive members 210a and 230b and a set of opposing capacitative clamping electrodes or clamps 421 attached to the vertical planar surfaces of comb drive bars 221 of movable comb drive members 208b and 209a. Electrode or clamp 420 on the backside of comb drive member 210a and electrode or clamp 421 on the backside of comb drive member 208b are movable between a spaced-apart position, which occurs when the comb drive fingers 211 of comb drive members 208a,208b and the comb drive fingers 212 of comb drive members 210a,210b are in an interdigitated relationship, and a position in which said clamps 420,421 are in close proximity to each other, which occurs when the comb drive fingers 211 of comb drive members 208a,208b and the comb drive fingers 212 of comb drive members 210a,210b are spaced apart from each other. similarly, electrode or clamp 420 on the backside of comb drive member 230b and electrode or clamp 421 on the backside of comb drive member 209a are movable between a spaced-apart position, which occurs when the comb drive fingers 211 of comb drive members 209a,209b and the comb drive fingers 212 of comb drive members 230a,230b are in an interdigitated relationship, and a position in which said clamps 420,421 are in close proximity to each other, which occurs when the comb drive fingers 211 of comb drive members 209a,209b and the comb drive fingers 212 of comb drive members 230a,230b are spaced apart from each other. When in such close proximity to each other, clamps 420,421 are preferably spaced apart approximately five microns.

The travel stop means and mirror monitoring means of actuator 301 does not include stop 261 and limiters 262 and 263. Instead, actuator 301 is provided with a rearward stop 292 which engages bracket 219 to limit the rearward movement of shuttle 109 and a forward stop 293 which engages bracket 219 to limit the forward movement of shuttle 109. Rearward stop 292 is electrically coupled by means of lead or trace 302 to an electrical pad 298 and forward stop 293 is electrically coupled by means of lead or trace 303 to an electrical pad 299. Pads 298 and 299 can be electrically coupled to controller 111 to permit monitoring of shuttle 109 in its retracted and extended positions. Additional rearward stops 292 and forward stops 293 are provided for each end of second comb drive member 208b and first comb drive member 209a.

In the method of operation of actuator 301, pulsed voltages are applied alternatively by controller 111 to the first and second fixed electrode assemblies 210,230 during start up of the actuator to resonate the first and second movable electrode assemblies 208,209 so as to achieve maximum oscillatory displacement of shuttle 109. Controller 111 includes conventional means for applying such pulsed voltage potentials between the opposed comb drive members during the half-stroke of electrode assembly 208 in which such opposed comb drive members are moving toward each other to urge the comb drive fingers 211,212 of these opposed comb drive members to their third or fully interdigitated position. At a preferred level of resonance, a steady voltage is applied between the clamp 420 on the fixed first comb drive member 210a through pad 240 and the clamp 421 on the movable second comb drive member 208b through pad 242 to move the electrode assemblies 208,209 to their retracted position and hold the mirror 103 in the retracted position.

When the mirror 103 is to be held in an extended position, the voltage between comb drive members 210a and 208b is first released, and the first and second movable electrode assemblies 208,209 swings under the forward spring force of spring 214 toward their second positions in which mirror 103 is in the extended position. A voltage pulse may then be applied to the comb drive fingers 212 of first and second comb drive members 210a,210b to pull the comb drive fingers 211 of respective first and second comb drive members 208a,208b assembly toward each other and thus move clamps 421 of movable electrode assemblies 208,209 toward clamps 420 of fixed electrode assemblies 210,230. A steady voltage is then applied between clamp 420 on the fixed comb drive member 230b through pad 241 and opposed clamp 421 on the movable comb drive member 209a through pad 242 to hold movable electrode assemblies 208,209 and mirror 103 in the extended position abutting stops 293. The mechanical stops 292 and 293 preferably define the extended and retracted positions and prevent the clamps 421 on the movable electrode assemblies 208,209 from touching the clamps 420 on the fixed electrode assemblies 210,230.

Figure 7:
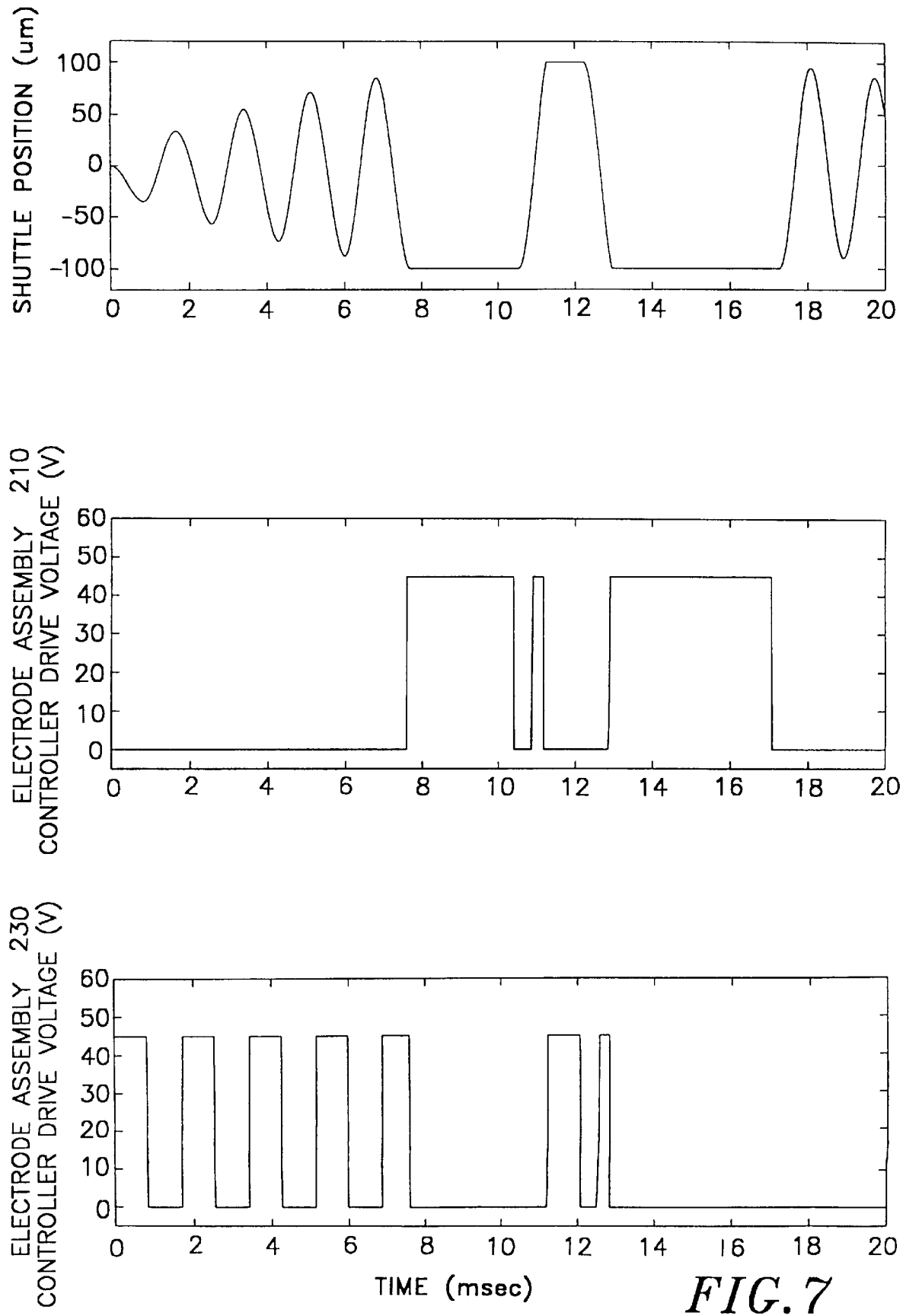
FIG. 7 contains graphs correlating the position of the shuttle of the electrostatic microactuator of FIG. 6 to a particular drive voltage.

An alternate method of starting up and operating the actuators of the present invention is now described with respect to actuator 301, input drive voltages shown in the bottom two graphs of FIG. 7 are provided by controller 111 to cause movement in shuttle 109 shown in the top graph in FIG. 7. At the outset, five pulses of 45 volts each are applied by controller 111 to first and second return comb drive members 230a,230b by means of electrical pad 240 to cause the actuator or micromotor 101 to oscillate through amplitudes increasing to 100 microns. Electrical pads 241 and 242 are held constant at zero volts during this start-up procedure. Immediately following the last of such 45 volt pulses, 45 volts is applied to first and second comb drive member 210a,210b so that electrostatic forces between clamp or clamping electrode 420 on first comb member 210*a* and clamp or clamping electrode 421 on second comb drive member 208*b* serve to retain the shuttle 109 in its retracted position approximately 100 microns from its static position shown in FIG. 6. Clamps 420,421 are approximately five microns apart at the fully retracted position of shuttle 109 so the applied voltage serves to hold shuttle 109 in this retracted position. Once the 45 volts is applied to first fixed electrode assembly 210, comb drive fingers 211 of movable electrode assembly 208 and comb drive fingers 212 of fixed electrode assembly 210 are approximately 100 microns apart so that no attractive forces are applied therebetween.

As can be seen in FIG. 7, the 45 volts applied to fixed electrode assembly 210 is released at about 11 milliseconds. A short pulse of 45 volts is thereafter applied to fixed electrode assembly 210 as shuttle 109 begins to swing toward its extended position. Clamp electrodes 420,421 are spaced sufficiently apart at this time so that no electrostatic forces are experienced therebetween. Instead, the pulsed voltage to assembly 210 serves to urge comb drive fingers 211 of electrode assembly 208 toward to opposed comb drive fingers 212 of electrode assembly 210. The pulsed voltage compensates for energy losses experienced during the half-stroke and thus swings shuttle 109 to its fully extended position. A potential of 45 volts is applied at this time to second fixed electrode assembly 230 so as to provide an electrostatic force between clamp 420 provided on the backside of second comb drive member 230*b* and the opposed clamp 421 disposed on the backside of second comb drive member 209*b*. These forces hold shuttle 109 in its extended position. At approximately 12 milliseconds, the shuttle is released from its extended position and a 45 volt pulse is thereafter applied to second fixed electrode assembly 230 to urge opposed second movable electrode assembly 209 and thus shuttle 109 to their retracted position where the shuttle is then retained by 45 volts applied to first fixed electrode assembly 210. It should be appreciated that during the start-up oscillations, pulsed voltages can be sequentially applied to one or both of first fixed electrode assembly 210 and/or second fixed electrode assembly 230 in a variety of configurations to achieve resonance in shuttle 109. It should be further appreciated that drive voltages that are other than square shaped can be provided by controller 111 to the actuators of the present invention for operation of the actuators.

As described above, actuator 301 is designed using DRIE techniques, permitting the various structures to be taller and thus have larger vertical surface areas than similar structures in the prior art. Clamps 420,421 therefore comprise a larger vertical surface area of fixed electrode assemblies 210,230 and movable electrode assemblies 208,209 and, thus, for any given distance between the clamps, form a larger attractive force between opposed clamps 420,421 than the prior art.

The voltage required to be applied to fixed electrode assemblies 210,230 for clamps 420,421 to retain the movable electrode assemblies 208,209 in their fully deflected positions is approximately four times less than the voltage required to be applied to the fixed electrode assemblies if the interengagement of comb drive fingers 211,212 is used to retain the movable electrode assemblies 208,209 in their fully deflected positions. Alternatively, the full voltage may be applied to a smaller number of comb drive fingers or teeth 211,212 to provide the same clamping force.

In actuator 301, electrodes or clamping electrodes 420 and 421 each comprise a plurality of small finger-like extensions 422 extending perpendicularly to the comb drive bar and spaced apart along the length of the comb drive bar. Extensions 422 have a length ranging from 3 to 25 microns, preferably ranging from 5 to 15 microns and more preferably approximately 13 microns. The extensions or teeth 218 at least partially interdigitate when electrodes 420,421 are in close proximity to each other and serve to increase the surface area over which the attraction force between finger-like electrodes 420,421 is applied. Clamps 420,421 can have no extensions 422 and thus be flat or have other conformations and be within the scope of the present invention.

If the movable electrode assembly 208*b* is released from the retracted position by clamps 420,421 of respective comb drive members 210*a*,208*b*, the movable electrode assemblies 208,209 swing back and forth about the static resting position with an amplitude that decreases by 10% each half period when actuator 101 has a Q of 14. Accordingly, when the initial retraction distance of electrode assemblies 208, 209 is 100 microns from the static position, opposing clamp electrodes 421,420 must exhibit sufficient attractive forces therebetween to capture the movable electrode assemblies 208,209 at the peak of its 90 micron excursion towards the extended position unless additional work is performed on the system by means of the electrostatic interaction of movable electrode assembly 209 and fixed electrode assembly 230.

Figure 8:
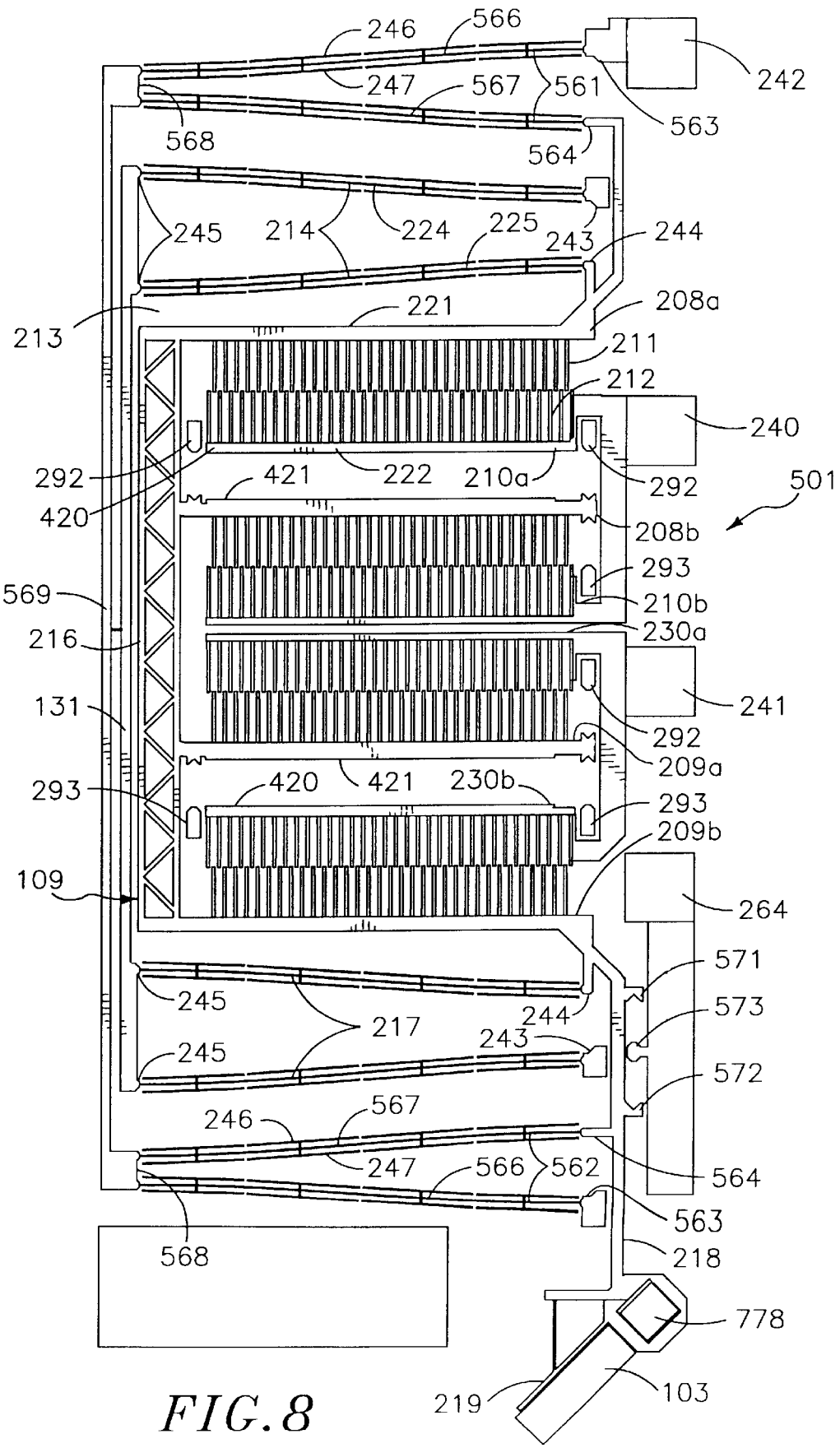
FIG. 8 is a plan view of another embodiment of an electrostatic microactuator of the present invention.

In another embodiment illustrated in FIG. 8, an actuator 501 formed from a silicon wafer provided which has springs 214,217 designed to be in a nonlinear and thus "bent" condition when in a static undeflected condition. Actuator 501 is substantially similar to actuators 101, 180 and 301 and like reference numerals have been used to describe like components of actuators 101, 180, 301 and 501. Spring portions 224,225 of each of springs 214,217 in actuator 501 bend toward each other when shuttle 109 is in its static condition midway between its retracted and extended positions. In this embodiment, as shuttle 109 moves from its home position to its retracted position and comb fingers 211,212 of second movable electrode assembly 209 and second fixed electrode assembly 230 electrostatically engage and thereafter overlap, spring 217 straightens out from its prebent home position to a linear position. Similarly, as the shuttle moves from its home position to its extended position and comb fingers 211,212 of first movable electrode assembly 208 and first fixed electrode assembly 210 engage and thereafter overlap, spring 214 straightens out from its prebent home position to a linear position. In each case, the side stiffness of the spring portions 224,225 of the respective spring increases in a direction perpendicular to the respective comb drive fingers 211 as such spring portions become linear in such direction. In this way, the side stiffness of the respective spring and the side restoring force exerted by such spring on such comb drive fingers 211 each increase as a function of the amount of overlap between comb drive fingers 211,212. Springs 214,217 thus serve to urge comb drive fingers 211 of the operative comb drive assembly to a stable position midway between the adjacent comb drive fingers 212 as such comb drive fingers 211,212 become interdigitated. Though the springs 214,217 straighten out when deflected in one direction, the spring portions 224,225 become further bent toward each other from their static position when shuttle 109 moves in the reverse direction.

A second set of folded cantilever beams or springs 561, 562 substantially similar in dimensions and composition to springs 214,217 are provided in actuator 501. Each of springs 561,562 is coupled at its first end 563 to substrate 213 and at its second end 564 to the movable electrode assemblies 208,209. Each set of springs 561,562 includes first and second spaced-apart, parallel spring portions 566, 567 joined by a folded portion 568. The springs 561,562 are connected at their folded portions 568 by a suspended rigid support 569 extending therebetween and parallel to rigid support 131. Supports 131,569 can be rigidly interconnected as shown in FIG. 8. Springs 561,562 extend substantially perpendicularly of the direction of travel of electrode assemblies 208,209 when in a relaxed position. More specifically, spring portions 566,567 bend away from each other when shuttle 109 is in its static condition midway between its retracted and extended positions, as shown in FIG. 8. As the overlap of the comb fingers 211,212 of first movable electrode assembly 208 and first fixed electrode assembly 210 increases and shuttle 109 moves to its extended position, the spring 562 is designed to straighten out to a linear position. Similarly, as the overlap of the comb fingers 211,212 of second movable electrode assembly 209 and second fixed electrode assembly 230 increases and shuttle 109 moves to its retracted position, the spring 561 is designed to straighten out to a linear position. Although the springs 561,562 straighten out when deflected in one direction, the spring portions 566,567 become further bent away from each other from their static position when shuttle 109 moves in the reverse direction. Springs 561,562 operate in the same manner described above with respect to springs 214,217.

In this four spring embodiment, one bent spring pair 214 or 561 and 217 or 562 at each end of the actuator 501 will preferably be straight and the other bent spring pair will be bent at each extreme of deflection of movable electrode assemblies 208,209. To maintain the same forward stiffness as the two bent spring actuator 101, the length of the springs 214,217,561,562 in actuator 501 is increased by 26%.

Figure 9:
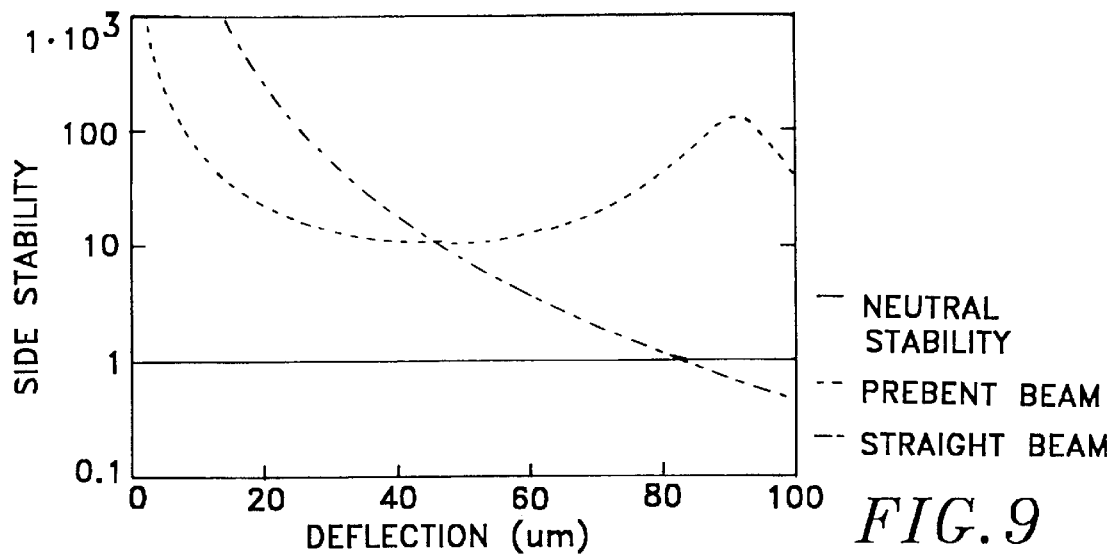
FIG. 9 is a graph of the side stiffness safety margin versus deflection for the electrostatic microactuator of FIG. 8.

FIG. 9 is a graph showing the relationship of the aggregate side stability for a four spring design such as the four spring 214,217,561,562 design of actuator 501 to the deflection of the springs. The side stability referred to in FIG. 9 is the ratio of aggregate side stiffness to the derivative of the aggregate side electrostatic force. In the graph of FIG. 9, side stability values less than one are unstable, while side stability values greater than one are stable. The "straight beam" line in FIG. 9 refers to beams such as springs 214,217 in actuator 101 described above. The "prebent beam" line in FIG. 9 refers to beams such as springs 214,217,561,562 in actuator 501. The springs 214,217,561,562 are designed to be straight at a position that maximizes the side stability at all positions. It is preferable that the side stability have a value of at least ten at all times. In actuator 501, each individual spring 214,217,561,562 has an initial bend of 43 microns, that is the movable end of each spring portion 224,225,566,567 is 43 microns from the position in which the spring portion is in a linear position perpendicular to the direction of travel, to raise the minimum side stability to ten as shown in the graph set forth in FIG. 9. Actuator 501 requires 154 volts to deflect the mirror 103 a distance of 100 microns from its home or relaxed position midway between its retracted and extended positions. As can be seen in FIG. 9, springs 214,217,561,562 provide a side stability of approximately 100 when mirror 103 is moved approximately 90 microns from its home position, spring portions 243,244,566,567 being straight at this position of the mirror.

Actuator 501 can be operated in a method similar to the operation of actuators 101, 180 and 301 described above. The stabilizing side forces provided by springs 214,217,561, 562 increase more quickly with side deflection of comb drive members 208,209 than the electrostatic side forces generated between interdigitating comb drive fingers 211, 212. In the example shown in FIG. 9, the stabilizing side forces increase at least ten times faster with side deflection than the electrostatic side forces.

A preferred method of operation of actuator or motor 501 is provided in which the pulsed voltages during any particular half-stroke are applied to the operative comb drive assemblies, that is the comb drive assemblies in which the comb drive fingers 211,212 thereof are coming into interdigitation during such half-stroke, when the comb drive fingers 211,212 are in their second position in partial electrical engagement and more preferably just barely engaged electrically, for example as shown in FIG. 8. Since the side instability forces between the comb drive fingers for a given voltage are proportional to the amount that they are engaged, the side instability forces can be minimized when voltages are applied during the first portion of engagement between the second and third positions of the comb drive fingers 211,212, preferably before the comb drive fingers are fully engaged in the third position and more preferably during the time period in which the comb drive fingers 211,212 travel from 0 to 25% engagement.

A forward or extension motion limit means or limiter 571 and a rearward or retraction motion limit means or limiter 572 are provided on extension 218 of movable electrode assemblies 208,209 for engaging a fixed stop 573 when electrode assemblies 208,209 are in their extended and retracted positions. Stop 573 is electrically coupled to pad 264 and thus controller 111 such that the controller can monitor the position of actuator 501 and thus the condition of switch 104. It should be appreciated that actuator 501 can be provided with clamps 420,421 of the type disclosed for actuator 301 and/or other features discussed above with respect to actuators 101, 180 and 301 and be within the scope of the present invention.

Figure 10:
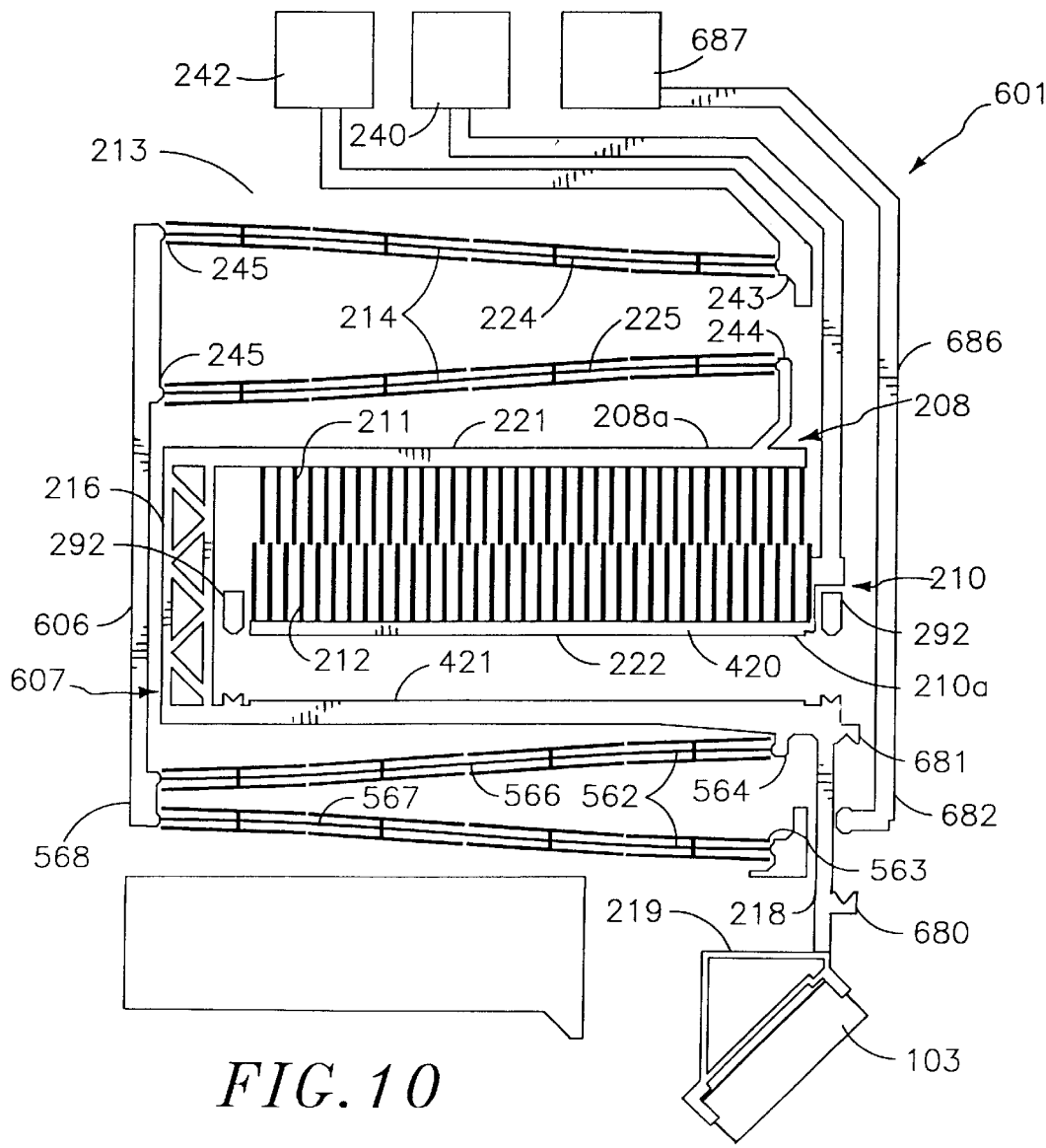
FIG. 10 is a plan view of yet a further embodiment of an electrostatic microactuator of the present invention.

FIG. 10 illustrates another embodiment of the actuator of the present invention. In this preferred embodiment, an actuator 601 is provided which has a single fixed electrode assembly 210 used to attract a single movable electrode assembly 208. Actuator 601 has similarities to actuators 101 and 501 described above and like reference numerals have been used to describe like components of actuators 101, 501 and 601. Movable electrode assembly 208 consists only of first comb drive member 208a and fixed electrode assembly 210 consists only of first comb drive member 210a. Only springs 214,562 shown in FIG. 8 with respect to actuator 501 are provided. Springs 214,562 are interconnected by a suspended rigid support 606 substantially similar to supports 131 and 569 described above. The single fixed electrode design of actuator 601 exhibits side instability in only the extended position of the mirror 103, since buckling side forces between the combdrive fingers 211,212 of the fixed 210 and movable 208 electrodes assemblies are generated only when the electrode assembly 208 is moved in this direction and comb drive fingers 211,212 become interdigitated. As a result, pre-bent springs 214,562 that straighten only when movable electrode assembly 208 is in the extended position are needed. A clamp electrode 420 is provided on comb drive bar 222 of comb drive member 210a and an opposing clamp 421 extends perpendicularly of the direction of travel of electrode assembly 208 and is rigidly connected to comb drive member 208a by trussed frame portion 216. The movable member or shuttle 607 of actuator 601 includes first comb drive member 208a, clamp electrode 421, truss 216, extension 218 and bracket 219.

In the exemplary embodiment of actuator 601 shown in FIG. 10, springs 214,562 are pre-bent by 46 microns. The separation between the comb teeth is preferably 18 microns. The planar surfaces of clamps 420,421 are preferably 800 microns long and 80 microns tall. The clamps 420,421 are five microns apart when clamping electrode 421 is against the rearward stop 292 and rearward stop 680 is engaged with stop 682. Although the clamps 420,421 are illustrated in FIG. 10 as being flat, it is understood that they could also include extensions 422 as illustrated in FIG. 6.

In contrast to actuator 301 in FIG. 6, actuator 601 of FIG. 10 uses a nonsymmetric design in which the extension displacement is somewhat larger than the retraction displacement. For example, the actuator 601 shown in FIG. 10 extends a distance of 112 microns and retracts a distance of 100 microns. Initially a voltage is applied to the fixed electrode 210 to deflect and hold the movable electrode portion 208 to the extended position under the electrostatic attraction forces of comb drive fingers 212,211. During a switching operation, where it is desired to retract a mirror 103 out of the path of a laser beam 191, the static voltage on the fixed electrode assembly 210 is released and the movable electrode assembly 208 and shuttle 607 swings towards the retracted position where it is held by the electrostatic forces between clamps 420,421. Springs 214,562 provide an initial mechanical retraction force on shuttle 607 during its swing rearwardly from its extended position. In the exemplary embodiment of actuator 601 shown in FIG. 10 where the movable electrode assembly 209 is held in an extended position 112 microns from the static resting position and then released, assembly 209 will swing 100 microns past its home position towards the retracted position and be captured by the clamp 420.

Figure 11:
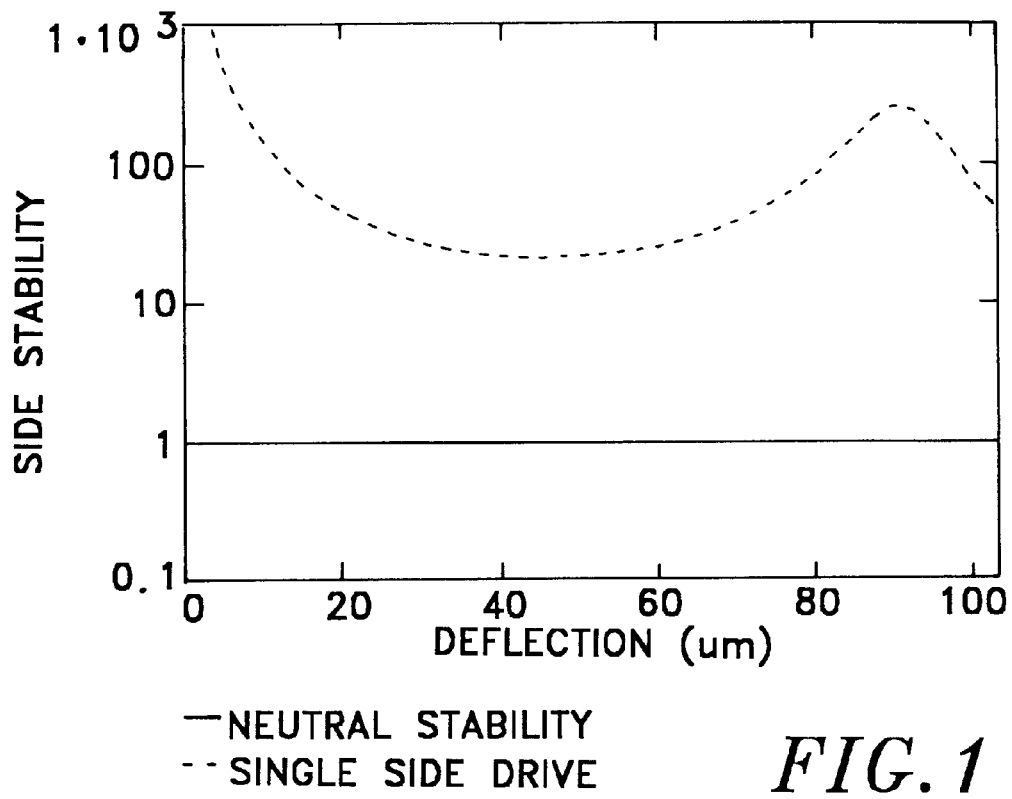
FIG. 11 is a graph of the side stiffness safety margin versus deflection for the electrostatic microactuator of FIG. 10.
Figure 12:
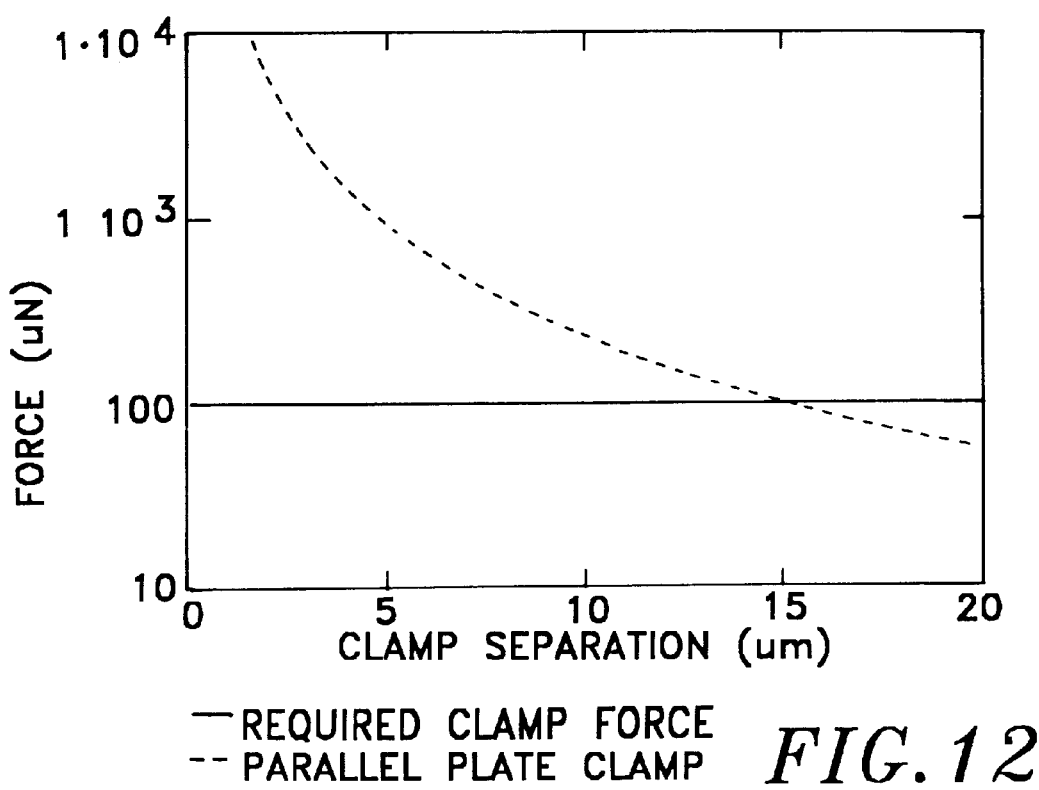
FIG. 12 is a graph of the clamping force versus clamping electrode separation for the electrostatic microactuator of FIG. 10.

The graph shown in FIG. 11 depicts the side stability of actuator 601 as a function of deflection and the graph shown in FIG. 12 illustrates the clamping force of clamp electrodes 420,421 in actuator 601 as a function of the separation distance between the clamp electrodes. As shown in these graphs, actuator 601 deflects rearwardly 112 microns with 196 volts and a minimum safety margin of 20. With a reasonable Q of for example 14, the movable electrode portion 208 will swing all the way to the rearward stop 680 even without the pull of the clamps 420,421. Thus, the larger forward extension distance of actuator 601 permits shuttle 607 and mirror 103 to swing rearwardly to a fully retracted position without the input of additional work into the actuator. In the retracted position, the suspension or springs 214,562 exert a 97 uN pull on the movable electrode portion 208 as shown by the solid horizontal line depicted as "Required Clamp Force" in FIG. 12. This force can be overcome by clamps 420,421 when the clamps are spaced apart a distance of 15 microns, as shown in FIG. 12 by the dashed lines depicted as "Parallel Plate Clamp". As can be seen from FIG. 12, the actual holding force of clamps 420,421 is 900 uN when the clamps are held five microns apart by the stops 680 and 292. The stops 680 and 292 serve to prevent undesirable contact between the clamping electrodes 420,421.

The aforementioned preferred embodiment uses a single-sided fixed electrode design yet permits a full +/−100 micron range of motion from the home or midway position of movable electrode assembly 208. Furthermore, the decreased area and mass of the preferred embodiment enables reduced cost and switching speed. The shortened length of actuator 601 permits two of the actuators to be disposed side-by-side as discussed below.

In switching applications, independent verification of the position of the mirror 103 is important. In microactuator 601, additional electrodes may be incorporated into the mechanical stops. When a mirror 103 in actuator 601 is in the extended position, forward limiter 681 of the movable electrode portion 208 is in engagement and electrical contact with stop 682. The stop 682 is electrically coupled by lead 686 to electrical pad 687, which can be electrically coupled to controller 111. Similarly, when the mirror 103 is held in the retracted position, rearward limiter 680 is in engagement and electrical contact with stop. Thus, the position of movable electrode assembly 208 and mirror 103 can be sensed electrically by controller 111 to confirm the state of actuator 601 and any switch or other device into which one or more of actuators 601 have been incorporated. Limiters 680,681 and stop 682 are included in the travel stop means of actuator 601.

Figure 13:
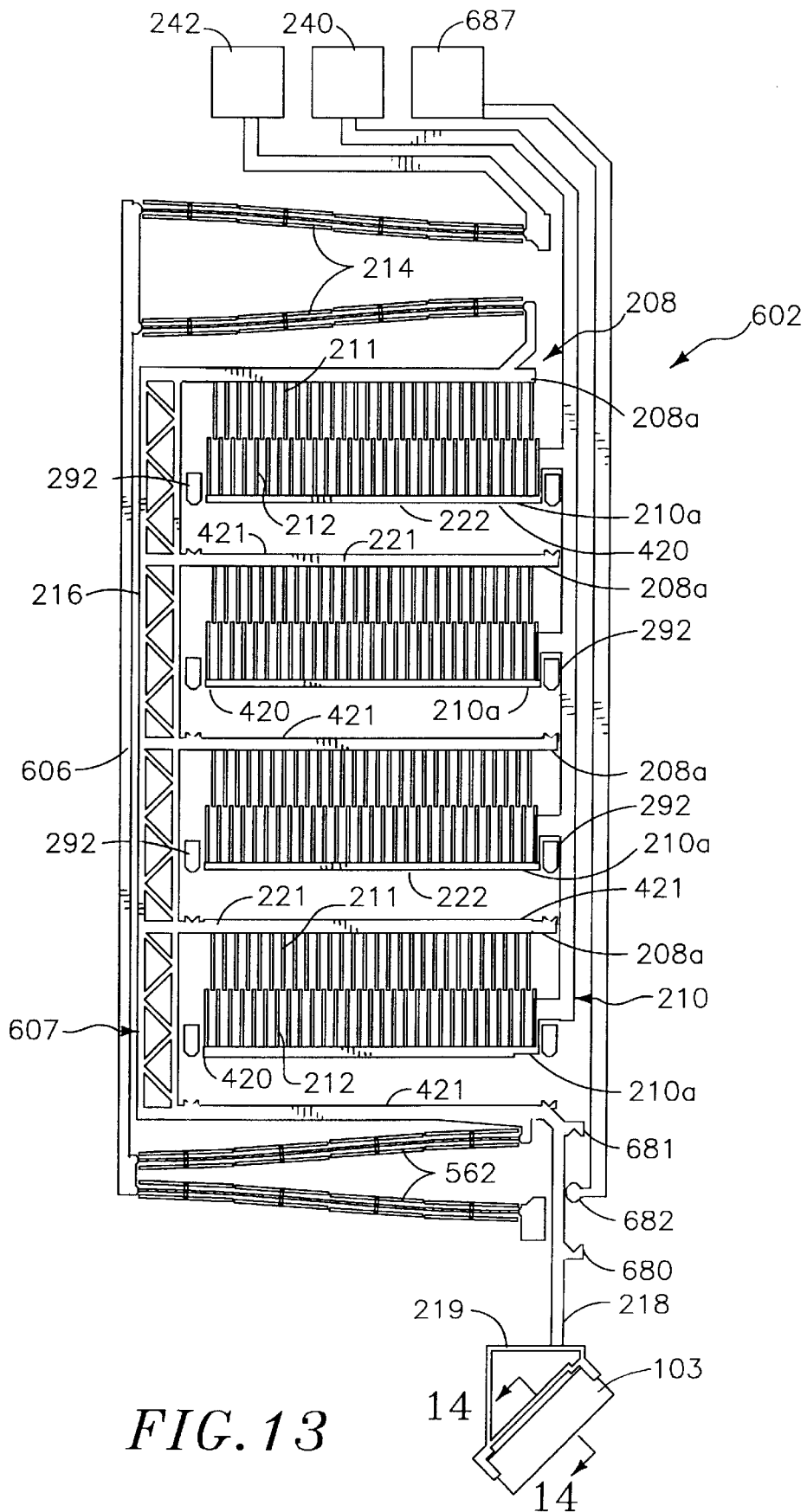
FIG. 13 is a plan view of another embodiment of an electrostatic microactuator of the present invention.

Actuator 601 illustrated in FIG. 10 can be expanded to include more than one set of cooperatively interengaging comb rive members 208a,210a. For example, a nonsymmetric actuator 602 substantially similar to actuator 601 is shown in FIG. 13. Like reference numerals have been used to describe like components of actuators 601 and 602. Movable electrode assembly 208 of actuator 602 is provided with four longitudinally spaced-apart comb drive members 208a. Fixed electrode assembly 210 of the actuator 602 is provided with four longitudinally spaced apart comb drive members 210a. Actuator 602 is provided with four sets of cooperating clamp electrodes 420,421. As the number of electrode assemblies 208,210 is increased, the width of each set of electrode assemblies 208,210 and thus the width of actuator 602 for any given force required to extend or retract the mirror 103 may be reduced. Thus, the distance over which a laser beam would have to remain optically collimated as it travels down the center of an optical microswitch of the type disclosed in copending U.S. patent application Ser. No. 09/135,236 filed Aug. 17, 1998 (A-66163) is reduced.

Figure 14:
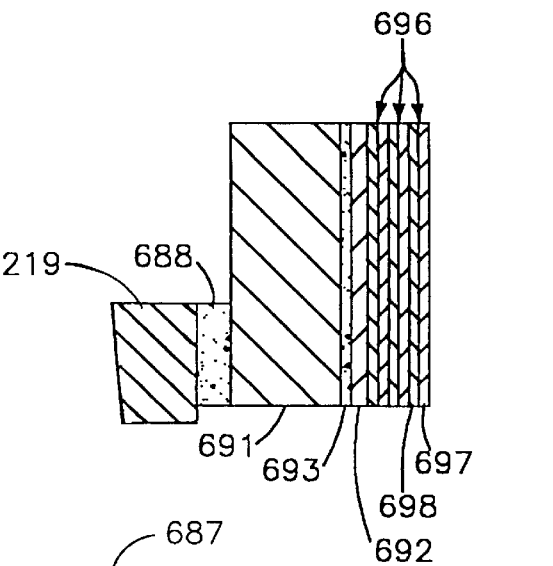
FIG. 14 is a cross-sectional view of a portion of the electrostatic microactuator of FIG. 13 taken along the line 14—14 of FIG. 13.

Because the mirrors of the electrostatic microactuators of the present invention can be used to couple a laser beam between an input port and a particular output port of an optical microswitch, the quality of the mirror used is important. To minimize optical losses due to absorption, scattering, and defocusing, the mirror 103 surface must be reflective, smooth, and flat. Mirrors 103 may be fabricated separately from very thin silicon wafers and later attached to extension 218 by any suitable adhesive 688 such as Norland NEA 123M, an ultraviolet initiated adhesive sold by Norland Products, Inc. located in New Brunswick, N.J. (see FIG. 14). The mirrors 103 may be made from a thin silicon wafer 691 having a layer 692 of any suitable reflective metal such as gold secured to the wafer 691 by a thin adhesion layer 693 made from chromium or any other suitable material. Other suitable reflective materials for layer 692 include aluminum and silver and another suitable material for adhesion layer 693 is titanium. The silicon wafer 691 has a thickness ranging from 20 to 300 microns and preferably approximately 80 microns and the reflective layer has a thickness ranging from 0.05 to 0.30 microns and preferably approximately 0.15 microns. The adhesion layer has thickness of approximately 0.005 microns. The metal layers may be deposited in a manner that minimizes their residual internal stress at room temperature. The resulting mirrors feature the high reflectivity of the gold or other reflective metal and the low surface roughness and high flatness of polished silicon.

Other layers or coatings may optionally be deposited over the reflective layer 692 to increase the reflectivity of mirror 103. In the mirror 103 shown in FIG. 14, multiple dielectric pairs 696 have been disposed on top of the reflective layer. Each pair 696 consists of a layer 697 of a relatively high index of refraction deposited on a layer 698 of a relatively low index of refraction. Where mirror 103 is used in an optical microswitch such as microswitch 1301 described below, layers 697 and 698 each have a thickness equivalent to one-quarter the wavelength of the laser beam traveling through such microswitch. Suitable materials for layers 697 include cerium oxide and titanium oxide, while suitable materials for layers 698 include magnesium fluoride and silicon dioxide.

Figure 15:
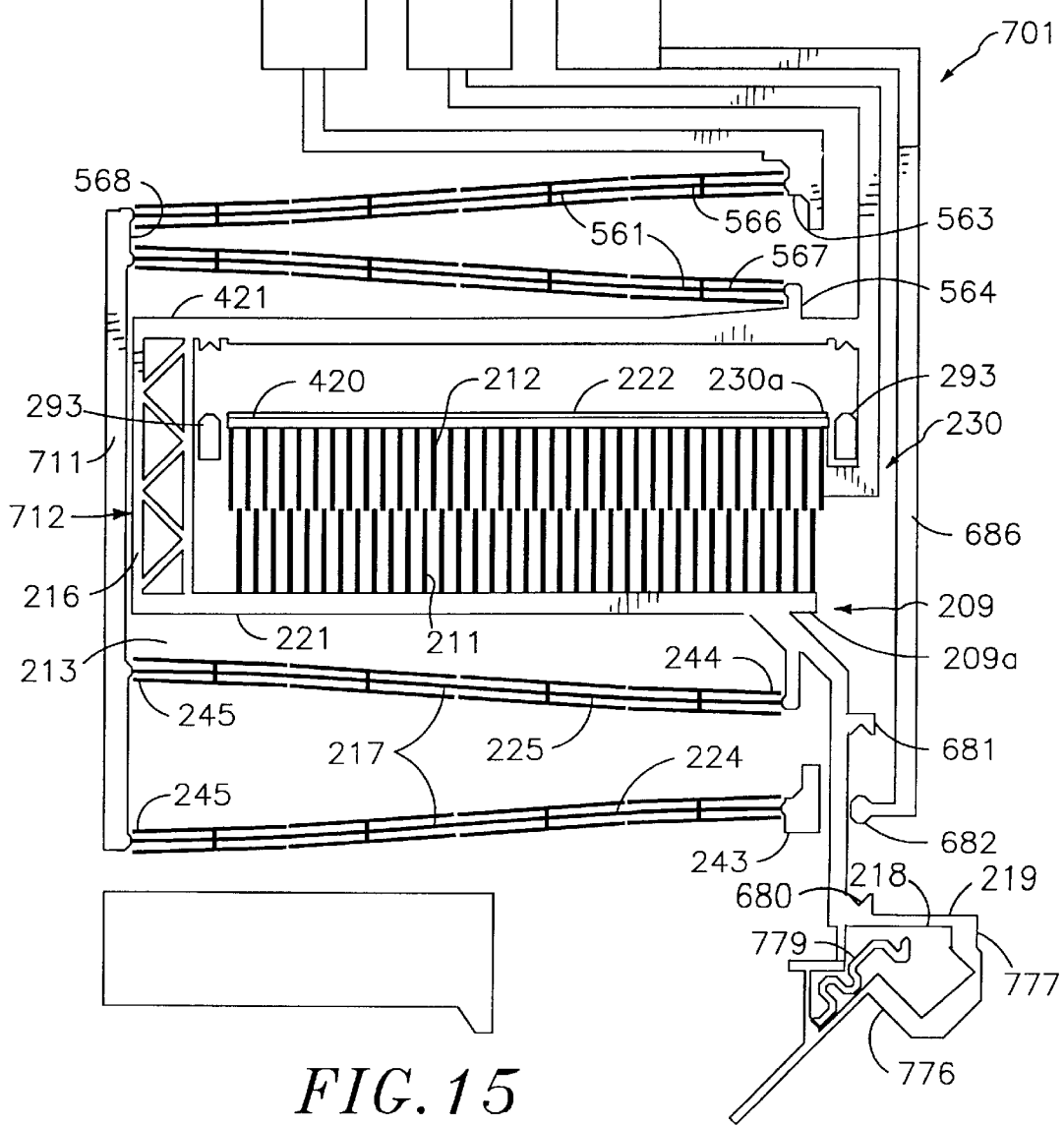
FIG. 15 is a plan view of a further embodiment of an electrostatic microactuator of the present invention without the mirror attached.
Figure 16:
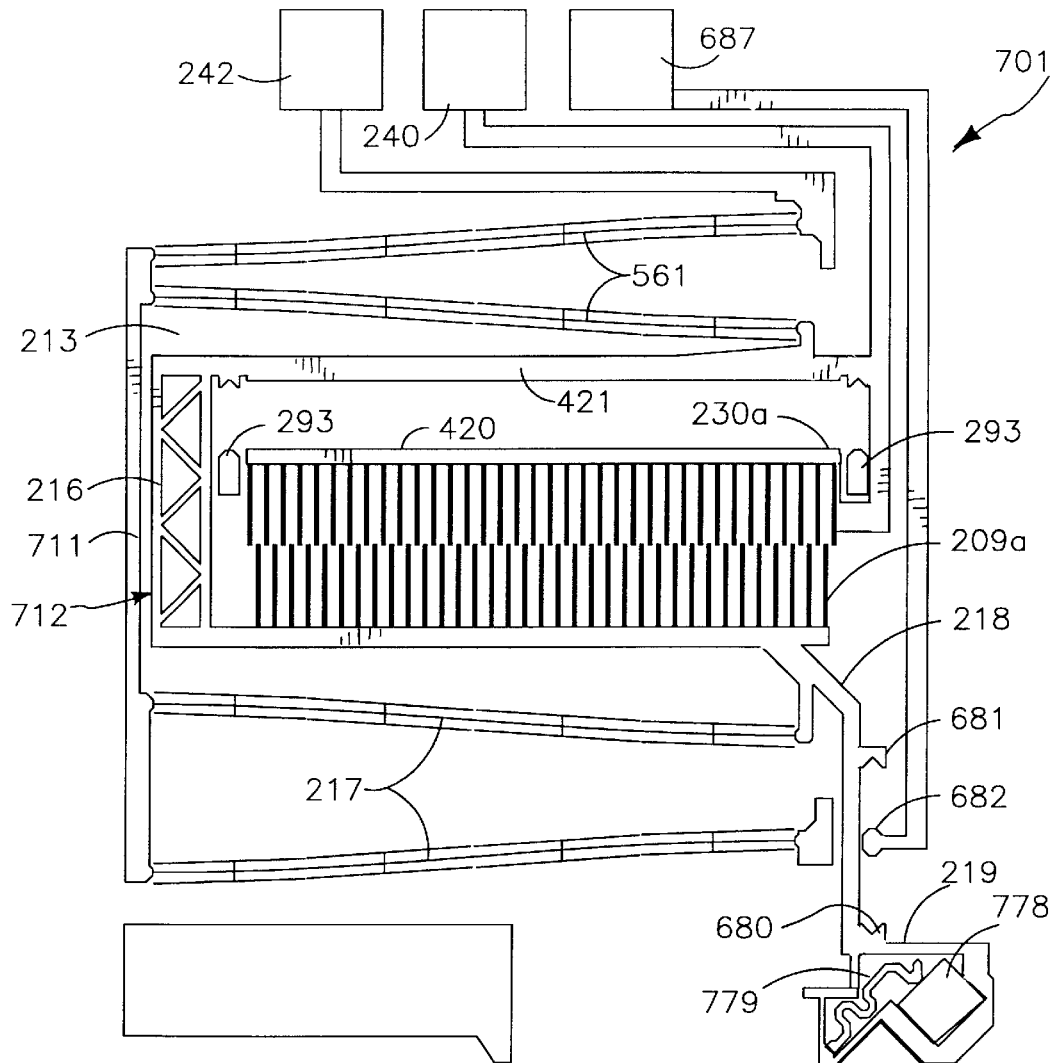
FIG. 16 is a plan view of the electrostatic microactuator of FIG. 15 with the mirror attached.

An actuator 701 having some of the components of actuator 501 illustrated in FIG. 8, but having only a single fixed electrode assembly and a single movable electrode assembly like actuator 601 shown in FIG. 10, is illustrated in FIGS. 15–16. Like reference numerals have been used to describe like components in actuators 701, 501 and 601. Movable electrode assembly 209 of actuator 701 consists only of comb drive member 209a and fixed electrode assembly 230 consists only of comb drive member 230a. Cantilever beam springs 561,217 of actuator 501 are provided in actuator 701, and the springs 561,217 are interconnected by a suspended rigid support 711 substantially similar to support 606 described above. Like actuator 601, actuator 701 exhibits side instability only in one of the extreme positions of movable electrode assembly 209. Specifically, side forces between comb drive fingers 211 of movable electrode assembly 209 and comb drive fingers 212 of fixed electrode assembly 230 are generated only when movable assembly 209 is moved to its retracted position in which the comb drive fingers 211,212 become interdigitated. The respective spring portions 566,567 and 224,225 of springs 561,217 straightened to a linear position of maximum stiffness in the lateral direction of actuator 701 when movable electrode assembly 209 is in its retracted position. A clamp electrode 420 is provided on the comb drive bar 222 of fixed comb drive member 230a. An opposing clamp 421 extends perpendicularly of the direction of travel and is rigidly connected at one end to comb drive member 209a by the trust frame portion 216. Second or free end 567 of spring portion 564 is secured to the other end of clamp 421. The movable member or shuttle 712 of actuator 701 includes first comb drive member 209a, clamp electrode 421, truss 216, extension 218 and bracket 219.

Actuator 701 operates in a manner substantially similar to actuator 601 except that cooperatively interengaging comb drive members 209a,230a are utilized for moving mirror 103 to a retracted position and opposed clamps 420,421 are utilized for retaining movable electrode assembly 209 and mirror 103 in an extended position upon movement of the mirror to the extended position under forward spring force of springs 561,217. The nonsymmetric design of actuator 701 provides for a greater retraction distance than forward extension distance. Hence, shuttle 712 can swing from its retracted position to an extended position sufficient for clamps 420,421 to engage without the input of additional work into the system.

As shown in FIGS. 15–16, precise placement of the mirrors 103 on the bracket 219 may be accomplished by DRIE etching a receptacle 776 and rectangular recess or socket 777 into the bracket 219 and by adding a peg portion 778 to the mirror 103. Once the mirror peg portion 778 is inserted into the socket 777, the mirror 103 can be glued in place in the receptacle 776 with any suitable adhesive means such as adhesive 688. The bracket may optionally include an etched spring portion 779 for holding the mirror 103 in alignment prior to gluing. A mirror assembly having no spring portion 779 is shown in FIG. 8 and a mirror assembly provided with a spring portion 779 is shown in FIG. 16.

Figure 17:
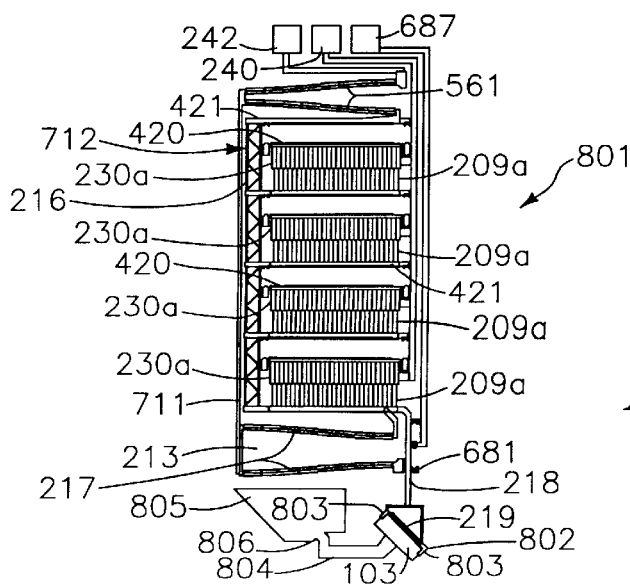
FIG. 17 is a plan view of another embodiment of an electrostatic microactuator of the present invention.

Alternate means can be provided for securing mirror 103 to bracket 219. For example, an actuator 801 formed from a silicon wafer similar to actuator 701 and having an arrangement of electrode assemblies similar to actuator 602 is shown in FIG. 17. Like reference numerals have been used to describe like components of actuators 701 and 801. Movable electrode assembly 209 of actuator 801 has four longitudinally spaced apart comb drive members 209a. Fixed electrode assembly 230 of the actuator 801 has four longitudinally spaced apart comb drive members 230a. Actuator 801 is provided with four sets of cooperating clamp electrodes 420,421. Bracket 219 of the actuator 801 is formed by DRIE etching and a receptacle 802 having upstanding shoulders 803 on each end thereof is provided. Mirror 103 is retained in receptacle 802 by any suitable adhesive means such as adhesive 688. Retention means or member in the form of a suspended thumb-shaped post 804 formed by DRIE etching from the wafer of actuator 801 is provided for aligning and retaining mirror 103 within receptacle 802 during gluing. Post 804 is rigidly secured to a portion 805 of the wafer, and thus substrate 213, by neck 806. Nonsymmetric actuator 801 has a retraction distance which is greater than the forward extension distance of the actuator.

In operation and use of actuator 801, shuttle 712 is retracted rearwardly against the restoring force of springs 561,217 to place mirror 103 on bracket 219. When shuttle 712 is thereafter relaxed, mirror 103 extends forwardly until the reflective surface of the mirror engages the free end of the post 804. The restoring force of springs 561,217 applies approximately 50 $\mu$N of force to mirror 103, which is sufficient to align the mirror perpendicular to the surface of substrate 213 and hold the mirror in place during the application and curing of the adhesive. After such attachment of mirror 103 to bracket 219, post 804 is removed by fracturing a neck 806 of reduced width provided on post 804.

Figure 18:
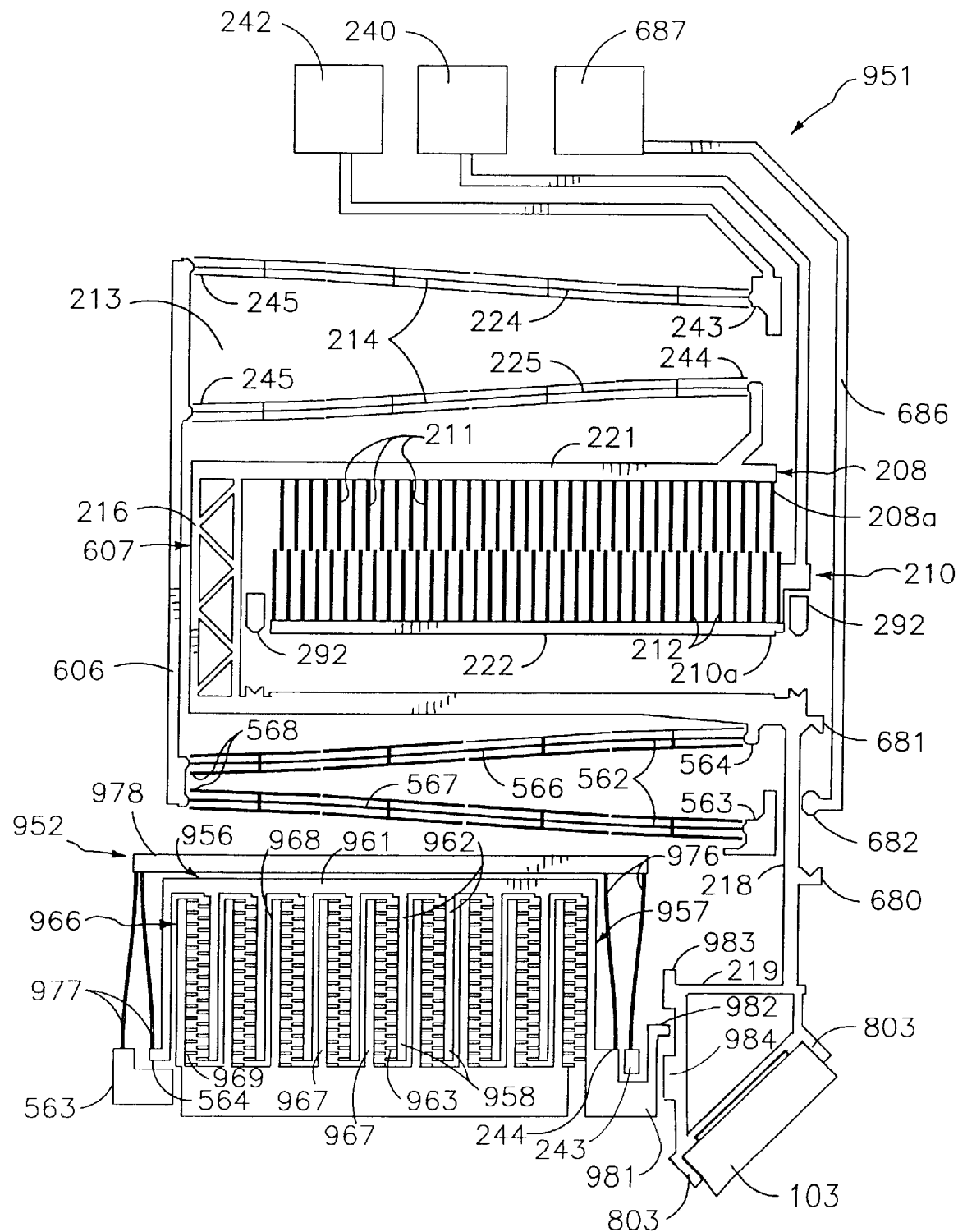
FIG. 18 is a plan view of a further embodiment of an electrostatic microactuator of the present invention.

In another embodiment of the actuator of the present invention, an actuator 951 is provided with an actuation means or actuator 952 for mechanically locking the mirror in both its fully extended position and its fully retracted position (see FIG. 18). Actuator 951 is substantially similar to actuator 601 and like reference numerals have been used to describe like components of actuators 951 and 601. Locking mechanism or secondary motor 952 is substantially similar to the primary motor of actuator 951, which includes first comb drive member 208a and first comb drive member 210a. Secondary or latch motor 952 is formed on silicon wafer or substrate 213 by any suitable means such as DRIE and includes a shuttle 956 movable in a direction perpendicular to the direction of travel of shuttle 607 between a first or retracted position and a second or extended position. Shuttle 956 includes a movable electrode assembly 957 formed from a plurality of comb drive members 958 longitudinally spaced-apart along the length of an elongate frame portion 961. The frame portion 961 extends parallel to the direction of travel of latch motor 952. Each comb drive member 958 has a comb drive bar 962 which is secured at one end to frame portion 961 and extends perpendicularly of the frame portion. A plurality of comb drive fingers 963 extend from one side of comb drive bar 962 and are longitudinally spaced-apart on the bar 962.

The comb drive assembly of actuator 951 further includes a fixed electrode assembly 966 which cooperatively interengages with movable electrode assembly 957. The fixed electrode assembly 966 includes a plurality of comb drive members 967 mounted on substrate 213. Each comb drive member 967 is interspaced between a pair of adjacent comb drive members 962 and is formed from a comb drive bar 968 disposed parallel to comb drive bars 962. A plurality of comb drive fingers 969 are formed integral with comb drive bar 968 and extend toward comb drive fingers 963 for cooperative inner engagement therewith. Movable and fixed electrode assemblies 957,966 are electrically connected to pads (not shown) similar to pads 240–242 described above which permit latch motor 952 to be electrically connected to controller 111.

Shuttle 956 is suspended above substrate 213 by spring member or spring 976 disposed at one end of shuttle 956 and spring member or spring 977 disposed at the opposite end of the shuttle. Springs 976 and 977 are substantially identical to springs 214 and 562, respectively. Like reference numerals have been used to describe like components of springs 976,977 and 214,562. A rigid support 978 substantially similar to rigid support 606 is suspended above substrate 213 for extension between the folded ends of spring 976 and 977.

The comb drive assembly of cooperatively interengaging comb drive members 958 and 967 operates in the same manner as the comb drive assemblies described above except that comb drive members 958,967 are movable between a first or static position in which comb drive fingers 963,969 are spaced apart in positions where the ends of the comb drive fingers 963,969 are in a line extending perpendicular to the direction of travel of shuttle 956 and a second position in which comb drive fingers 963,969 interdigitate. Shuttle 956 is pulled rearwardly by the electrostatic forces between comb drive members 958,967 and is pushed forwardly by the mechanical force of springs 967,977. Latch motor 952 is normally closed in its first position shown in FIG. 18.

Shuttle 956 has an extension 981 with a pin 982 movable between extended and retracted positions. Pin 982 is normally in its extended position. Bracket 219 of actuator 951 is provided with first and second spaced-apart stops 983 and 984 which form a recess therebetween for receiving pin 982 when shuttle 607 is in its relaxed position.

In operation and use, when it is desired to move mirror 103 to its retracted position, latch motor 952 is activated so that electrostatic forces between comb drive members 958, 967 cause shuttle 956 to retract and pull pin 982 rearwardly. Second stop 984 may now pass by the pin 982 as mirror 103 retracts. Latch motor 952 is then deactivated so that springs 976,977 urge shuttle 956 to its normally closed position in which pin 982 engages the bottom end of second stop 984 so as to preclude bracket 219 and thus mirror 103 from extending. In a similar manner, pin 982 can be retracted by latch motor 952 to permit extension of mirror 103. Upon deactivation of the latch motor 952, pin 982 extends so as to engage the top end of first stop 983 and lock mirror 103 in its extended position. Each of springs 976 and 977 moves from its static bent position to a straight or linear position upon retraction of shuttle 956 and thus serve to provide a side stabilizing force to movable comb drive fingers 963 as they interdigitate with fixed comb drive fingers 969.

Latch motor 952 permits mirror 103 to be locked in either its fully extended or fully retracted position without the necessity of a voltage being applied to actuator 951, which may be advantageous should actuator 951 be utilized in telecommunications or network systems. In the embodiment shown, latch motor 952 has a four micron deflection when provided with a 200 volt input signal and has an eight kHz resonant frequency. Although actuator 951 has no electrostatic clamping electrodes of any of the types described above, it should be appreciated that such clamping electrodes can be provided with actuator 951 and be within the scope of the present invention.

Figure 19:
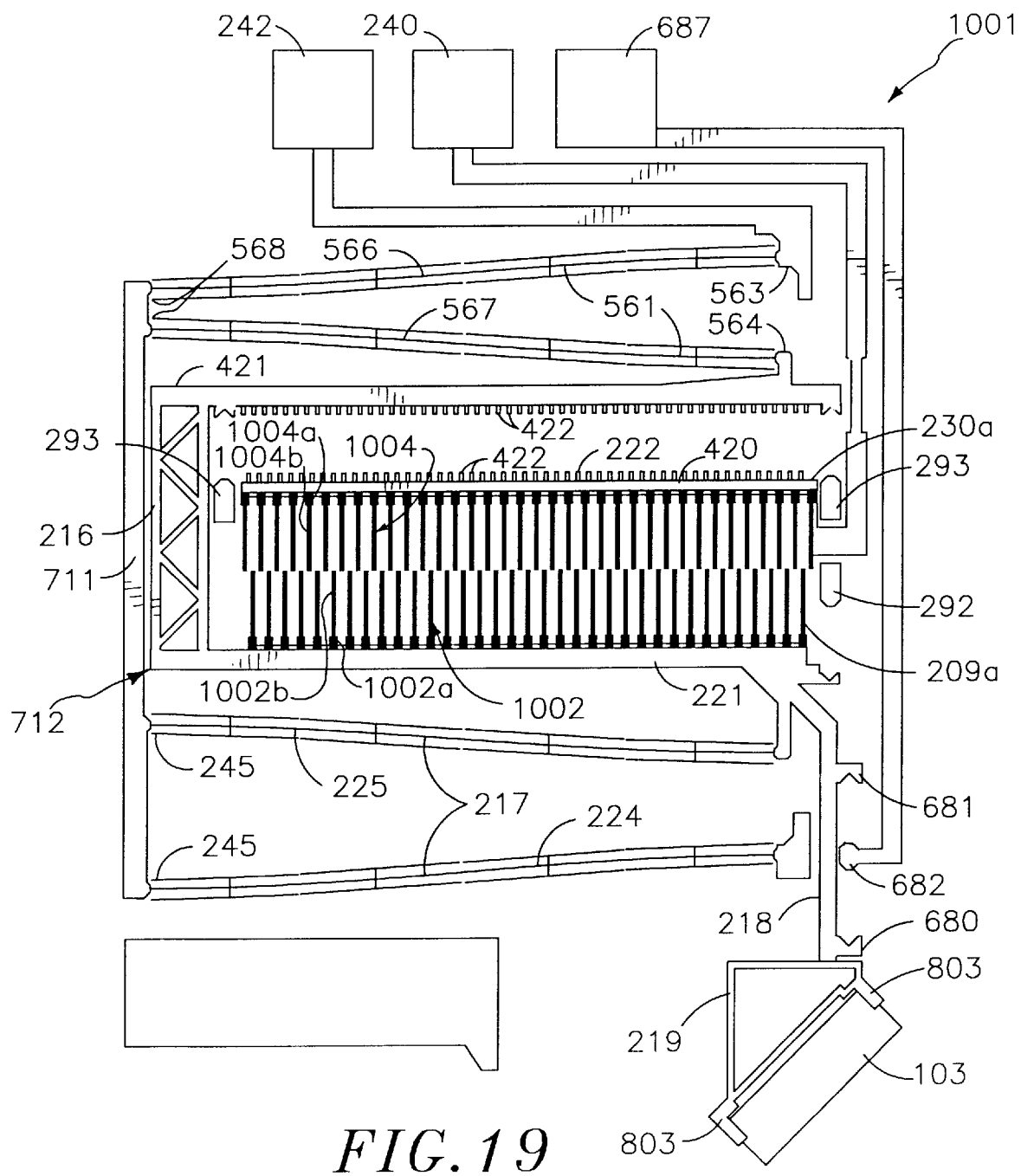
FIG. 19 is a plan view of yet a further embodiment of an electrostatic microactuator of the present invention.

In another embodiment, an actuator can be provided having a first set of electrostatic clamping electrodes for retaining the mirror in its retracted position and a second set of electrostatic clamping electrodes for retaining the mirror in its fully extended position. Actuator 1001 shown in FIG. 19 is substantially similar to actuator 701 described above and like reference numerals have been used to describe like components of actuators 701 and 1001. Actuator 1001 has a comb drive assembly which includes movable comb drive member 209a and fixed comb drive member 230a. The movable comb drive member 209a includes comb drive bar 221 and a plurality of elongate comb drive fingers 1002 longitudinally spaced-apart along the length of bar 221. Comb drive fingers 1002 each have a proximal end portion 1002a secured to comb drive bar 221 and a distal or free end portion disposed away from bar 221.

The proximal end portion 1002a of each comb drive finger 1002 is wider than the remainder of the comb drive finger such that the comb drive finger necks down distally of the proximal end portion 1002a. More specifically, the proximal end portion 1002a of each comb drive finger 1002 has a width ranging from 100% to 300%, preferably ranging from 130% to 190% and more preferably approximately 165% of the width of the balance of the comb drive finger. The widened proximal end portion 1002a has a length ranging from 1% to 30%, preferably ranging from 5% to 15% and more preferably approximately 8% of the length of the comb drive finger.

Fixed comb drive member 230a has a size and shape substantially similar to comb drive member 209a and is formed with a plurality of comb drive fingers 1004 substantially similar to comb drive fingers 1002. Specifically, each of comb drive fingers 1004 has a widened proximal end portion 1004a the same as proximal end portion 1002a and a narrowed distal or free end portion 1004b the same as free end portion 1002b.

A first clamp electrode 420 is provided on the backside of comb drive bar 222 opposite comb drive fingers 1004. A second clamp electrode 421 is attached perpendicularly to trussed frame portion 216 and extends parallel to comb drive bar 222. Each of electrodes 420 and 421 is provided with finger-like extensions 422 which are spaced longitudinally apart therealong.

Comb drive members 209a,230a are movable between a first position in which comb drive fingers 1002,1004 are spaced apart and clamp electrodes 420,421 are in close proximity to each other, a second position as shown in FIG. 19 in which comb drive fingers 1002,1004 are commencing electrostatic interaction and the free ends thereof are disposed along a line extending perpendicular to the comb drive fingers, and a third position in which comb drive fingers 1002,1004 are interdigitated so that the distal end portions of one set of comb drive fingers is in close proximity to the widened or enlarged proximal end portions of the other set of comb drive fingers. More specifically, the free end portions of the comb drive fingers extend between the enlarged proximal end portions of the opposed set of comb drive fingers when the comb drive members 209a, 230a are in the third position.

In operation and use, the startup procedure for actuator 1002 is as discussed above. In general, a pulsed voltage potential is provided across comb drive members 209a,230a by controller 111 to cause shuttle 712 to oscillate at its resonant frequency. The pulsed signal is preferably applied when the comb drive members are in their second positions so as to minimize side instability forces between comb drive fingers 1002,1004. Electrostatic comb drive members 209a, 230a cause the shuttle 712 to retract from its relaxed or intermediate position shown in FIG. 19 during the rearward half-stroke. The restoring force of springs 217,561 cause the shuttle 712 to extend from its retracted position during the forward half-stroke. Springs 217,561 also assist in causing retraction in the shuttle once the shuttle has moved to an extended position beyond its relaxed position shown in FIG. 19.

Once shuttle 712 has been oscillated to its maximum amplitude, the first and second sets of electrostatic clamping electrodes of actuator 1001 can be used to retain the shuttle in either its fully retracted position or its fully extended position. When the shuttle is in its fully retracted position, a voltage potential can be applied across the fully interdigitated comb drive fingers 1002,1004 so as to cause the enlarged proximal end portions 1002a,1004a of the comb drive fingers to act as clamping electrodes with respect to the free end portions 1004b,1002b of the opposed comb drive fingers. When the shuttle 712 is in its fully extended position, a voltage potential can be applied across comb drive members 209a,230a to provide an electrostatic attraction force between clamps 420,421 for retaining the shuttle 712 and mirror 103 in their fully extended positions. It is preferable that the voltage potential to the clamping electrodes of actuator 1001 be applied when shuttle 712 is near one of its extreme positions and preferably within five percent of its extreme position. Accordingly, for a shuttle 712 which deflects 100 microns towards both its fully retracted and fully extended positions so as to have an overall stroke length of 200 microns, the voltage potential is applied between opposed clamping electrodes during the last five microns of stroke travel.

Other embodiments of the actuator of the present invention can be provided wherein at least one of the comb drive members has comb drive fingers which vary in length. Actuator 1021 in FIG. 20 exemplifies the foregoing. The actuator 1021 is substantially similar to actuators 601 and 1001 and like reference numerals have been used to describe like components of the actuator 601, 1001 and 1021. Comb drive member 209a of movable electrode assembly 209 in actuator 1021 has a plurality of elongate comb drive fingers 1021 longitudinally spaced-apart along the length of comb drive bar 221. Fingers 1022 are substantially similar to fingers 212 described above except that the fingers vary in length. Specifically, fingers 1022 increase linearly in length across the comb drive bar 221. The longest comb drive finger 1022 is substantially the same length as each of comb drive fingers 211 in the opposed fixed comb drive member 238. The shortest comb drive finger 1022 has a length ranging from 0% to slightly less than 100%, preferably ranging from 5% to 50% and more preferably approximately 10% of the length of the longest comb drive finger 1022.

Figure 20:
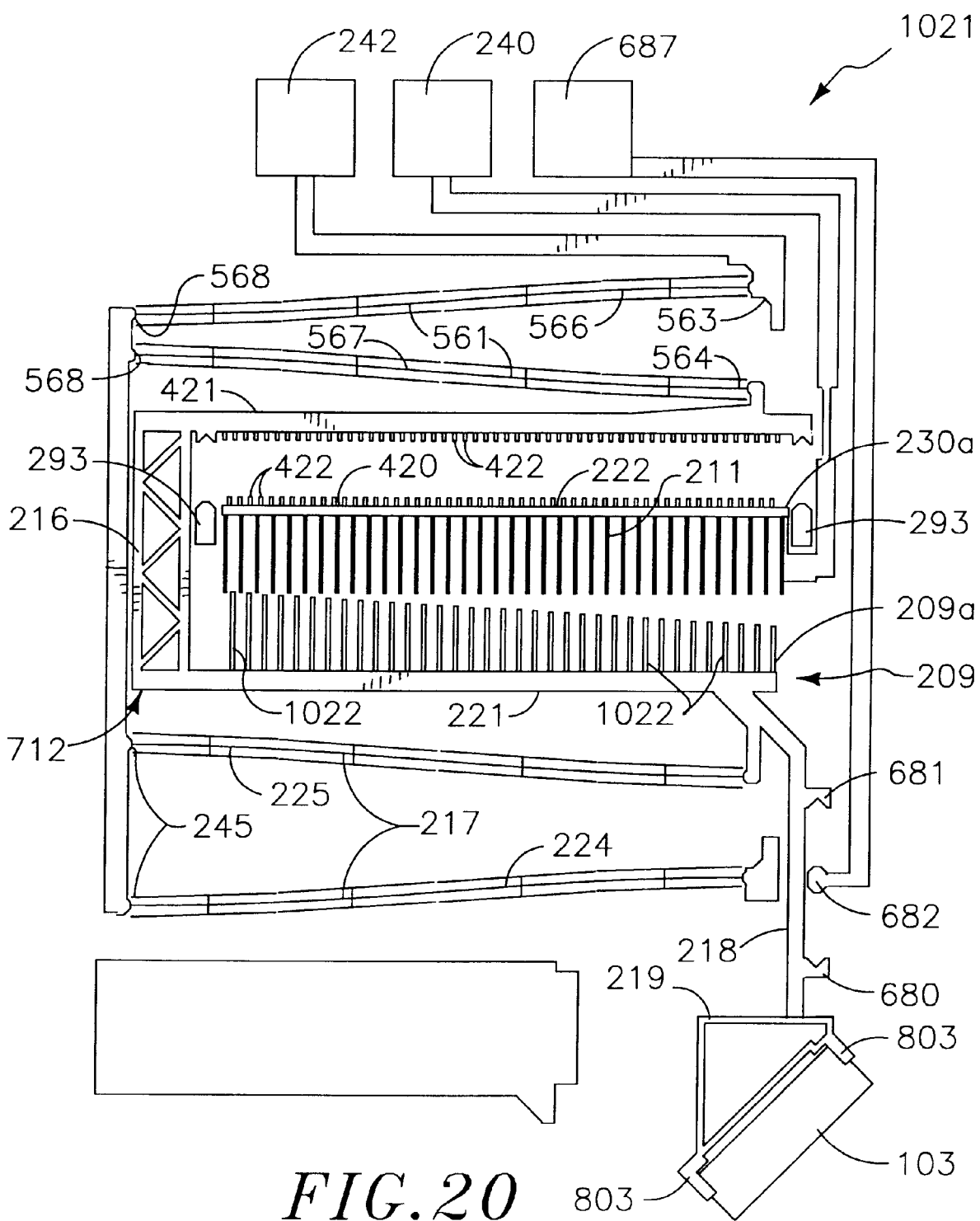
FIG. 20 is a plan view of another embodiment of an electrostatic microactuator of the present invention.

Shuttle 712 is movable from a first position in which comb drive members 209a and 230a are spaced apart such that clamps 420 and 421 are not in cooperative electrostatic engagement, to a second position shown in FIG. 20 in which comb drive fingers 211 and the longest comb drive finger 1022 are disposed along a line extended perpendicularly of the comb drive fingers and to a third position in which comb drive fingers 211 and 1022 are in full cooperative interdigitation.

In operation and use, the varying lengths of comb drive fingers 1022 provide an electrostatic attraction force which increases approximately linearly from the point where the longest comb drive finger 1022 commences cooperative electrostatic engagement with comb drive fingers 211 to the point where the shortest comb drive finger 1022 commences cooperative electrostatic engagement with the comb drive fingers 211. As a result, after the electrostatic attraction force between the opposing comb drive fingers increases to an amount greater than the opposing forward spring force of springs 217,561, further deflection of shuttle 712 causes the electrostatic attraction force to further increase so as to rapidly move the mirror 103 to its fully retracted position. The larger electrostatic attraction force permitted by comb drive fingers 1022 allows springs 217,561 with a larger forward spring force to be provided and thus increases the retraction frequency of actuator 1021.

Although the length of comb drive fingers 1022 is shown as increasing linearly from one end of comb drive member 209a to the other, it should be appreciated that a comb drive member having other configurations of varying sized comb drive fingers can be provided. Furthermore, it should be appreciated that the comb drive fingers 211 of the opposed comb drive member 230a can also be provided with varying lengths and be within the scope of the present invention.

The actuators of the present invention can be provided with larger configurations for providing greater force. In this regard, a microactuator 1201 substantially similar to actuator 501 and having a central, rigid drive bar 1202 substantially similar to connector truss 216 is provided (see FIG. 21). Drive bar 1202 moves above substrate 213 along a central longitudinal axis 1203 of actuator 1201. Like reference numerals have been used to describe like components of actuators 501 and 1201. Four comb drive assemblies 208,210 are included within actuator 1201 for retracting the drive bar 1202 from its home or at-rest position shown in FIG. 21 to a retracted position and four different comb drive assemblies 209,230 are included within actuator 1201 for extending the drive bar 1202 from its at-rest position to an extended position. Actuator 1201 moves downwardly in FIG. 21 to its retracted position and upwardly to its extended position.

Comb drive assemblies 208,210 are disposed on the opposite side of drive bar 1202 from comb drive assemblies 209,230. First movable electrode assembly 208 has four comb drive members 208a,208b,208c,208d formed integral with movable drive bar 1202 and extending perpendicularly thereof and second movable electrode assembly 209 has four comb drive members 209a,209b,209c,209d formed integral with the drive bar and extending perpendicularly of the drive bar in an opposite direction from comb drive members 208a,208b,208c,208d. First fixed electrode assembly 210 has four comb drive members 210a,210b,210c,210d mounted on substrate 213 for cooperatively engaging with respective comb drive members 208a,208b,208c,208d and second electrode assembly 230 has four comb drive members 230a,230b,230c,230d mounted on substrate 213 for cooperatively engaging with respective comb drive members 209a,209b,209c,209d.

Actuator 1201 is formed from a silicon wafer and is provided with first and second springs 214,217 designed to be in a nonlinear and thus "bent" condition when in a static undeflected condition. Each of springs 214,217 is coupled at its first end 243 to substrate 213 and at its second end 244 to shuttle 109. Spring portions 224,225 of each of springs 214,217 in actuator 1201 bend toward each other when shuttle 109 is in its static condition midway between its retracted and extended positions. In this embodiment, as shuttle 109 moves from its home position to its extended position and comb fingers 211,212 of second movable electrode assembly 209 and second fixed electrode assembly 230 electrostatically engage and thereafter overlap, spring 217 straightens out from its prebent home position to a linear position. Similarly, as the shuttle 109 moves from its home position to its retracted position and comb fingers 211,212 of first movable electrode assembly 208 and first fixed electrode assembly 210 engage and thereafter overlap, spring 214 straightens out from its prebent home position to a linear position. In each case, the side stiffness of the spring portions 224,225 of the respective spring increases in a direction perpendicular to the respective comb drive fingers 211 as such spring portions become linear in such direction. In this way, the side stiffness of the respective spring and the side restoring force exerted by such spring on such comb drive fingers 211 each increase as a function of the amount of overlap between comb drive fingers 211,212. Springs 214,217 thus serve to urge comb drive fingers 211 of the operative comb drive assembly to a stable position midway between the adjacent comb drive fingers 212 as such comb drive fingers 211,212 become interdigitated. Though the springs 214,217 straighten out when deflected in one direction, the spring portions 224,225 become further bent toward each other from their static position when shuttle 109 moves in the reverse direction.

Figure 21:
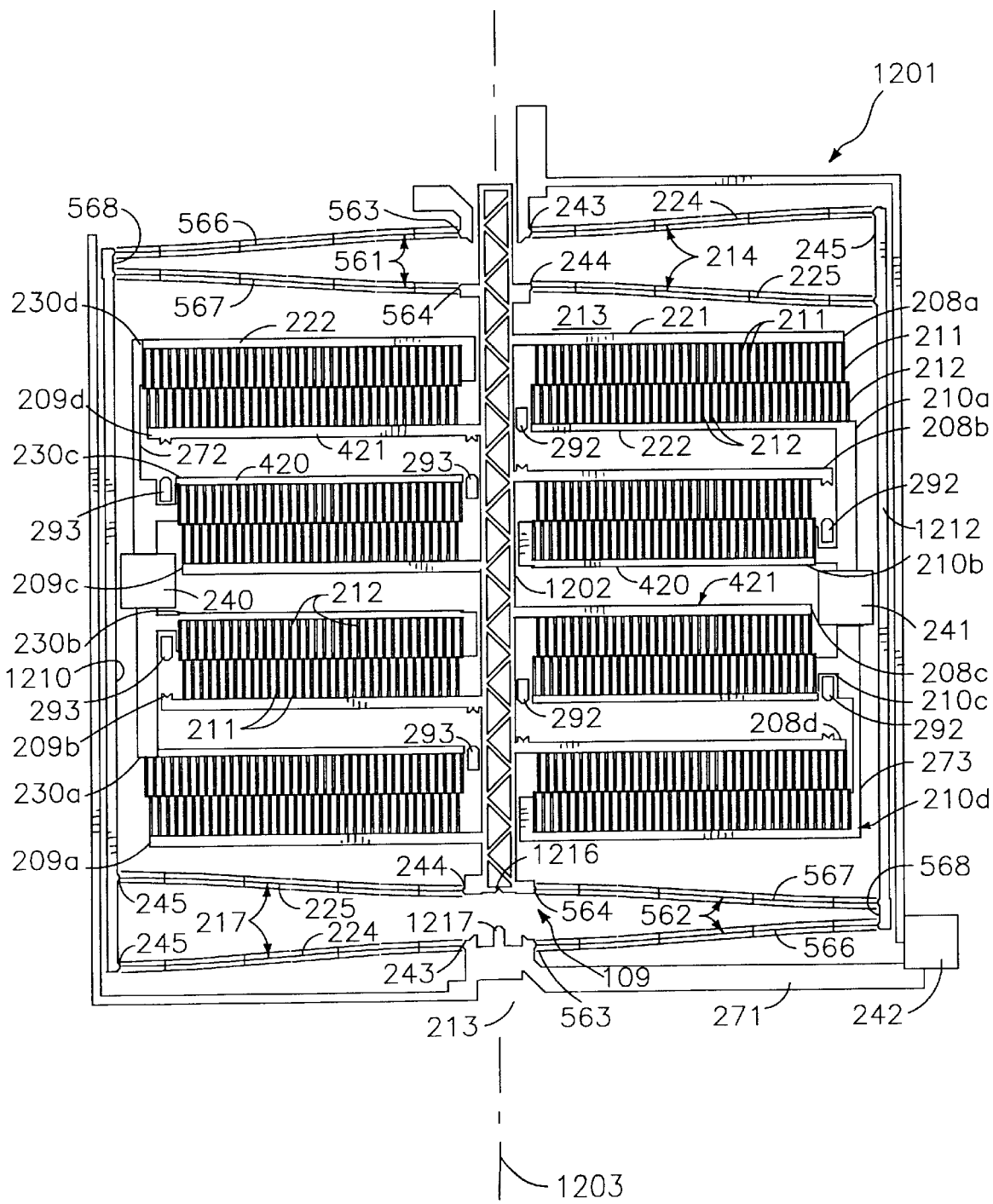
FIG. 21 is a plan view of yet another embodiment of an electrostatic microactuator of the present invention.

A second set of folded cantilever beams or springs 561, 562 substantially similar in dimensions and composition to springs 214,217 are provided in actuator 1201. Each of springs 561,562 is coupled at its first end 563 to substrate 213 and at its second end 564 to shuttle 109. Each set of springs 561,562 includes first and second spaced-apart, parallel spring portions 566,567 joined by a folded portion 568. springs 561,562 extend substantially perpendicularly of the direction of travel of electrode assemblies 208,209 when in a relaxed position. More specifically, spring portions 566,567 bend away from each other when shuttle 109 is in its static condition midway between its retracted and extended positions, as shown in FIG. 21. As the overlap of the comb fingers 211,212 of first movable electrode assembly 208 and first fixed electrode assembly 210 increases and shuttle 109 moves to its retracted position, the spring 562 is designed to straighten out to a linear position. Similarly, as the overlap of the comb fingers 211,212 of second movable electrode assembly 209 and second fixed electrode assembly 230 increases and shuttle 109 moves to its extended position, the spring 561 is designed to straighten out to a linear position. Although the springs 561,562 straighten out when deflected in one direction, the spring portions 566,567 become further bent away from each other from their static position when shuttle 109 moves in the reverse direction. Springs 561,562 operate in the same manner described above with respect to springs 214,217.

Springs 217,561 are disposed on opposite ends of comb drive assemblies 209,230 on one side of drive bar 1202 and springs 214,562 are disposed on opposite ends of comb drive assemblies 208,210 on the other side of the drive bar 1202. The first end portions 243,563 of springs 214,217,561,562 are secured to substrate 213 in close proximity to central longitudinal axis 1203. The springs 217,561 are connected at their respective folded portions 245,568 by a suspended rigid support 1210 substantially similar to rigid support 131 extending therebetween and parallel to drive bar 1202. The springs 214,562 are connected at their respective folded portions 245,568 by a suspended rigid support 1212 substantially similar to rigid support 131 extending therebetween and parallel to drive bar 1202. In the four spring embodiment of actuator 1201, one bent spring pair 214 or 561 and 217 or 562 at each end of the actuator 501 will preferably be straight and the other bent spring pair will be bent at each extreme of deflection of movable electrode assemblies 208,209 and shuttle 109. The springs 214,217, 561,562 and shuttle 109 have high out-of-plane stiffness as discussed above.

Actuator 1201 can be operated in a method similar to the operation of actuator 501 described above. The forward or upper end or drive bar 1202 is used to exert a force or provide movement to a suitable object. The stabilizing side forces provided by springs 214,217,561,562 increase more quickly with side deflection of comb drive members 208,209 than the electrostatic side forces generated between interdigitating comb drive fingers 211,212. In the example shown in FIG. 21, the stabilizing side forces increase at least ten times faster with side deflection than the electrostatic side forces. The disposition of comb drive assemblies on both sides of drive bars 1202 increase the force of actuator 1201 without increasing the length of the actuator and the length of the drive bar 1202.

A rearward or retraction motion limit means or limiter 1216 is provided on the rear end of drive bar 1202 for engaging a fixed stop 1216 mounted on substrate 213 when shuttle 109 is in its retracted position. It should be appreciated that actuator 1201 can be provided with or without clamps 420,421 and/or other features discussed above with respect to the actuators herein and be within the scope of the present invention.

Figure 22:
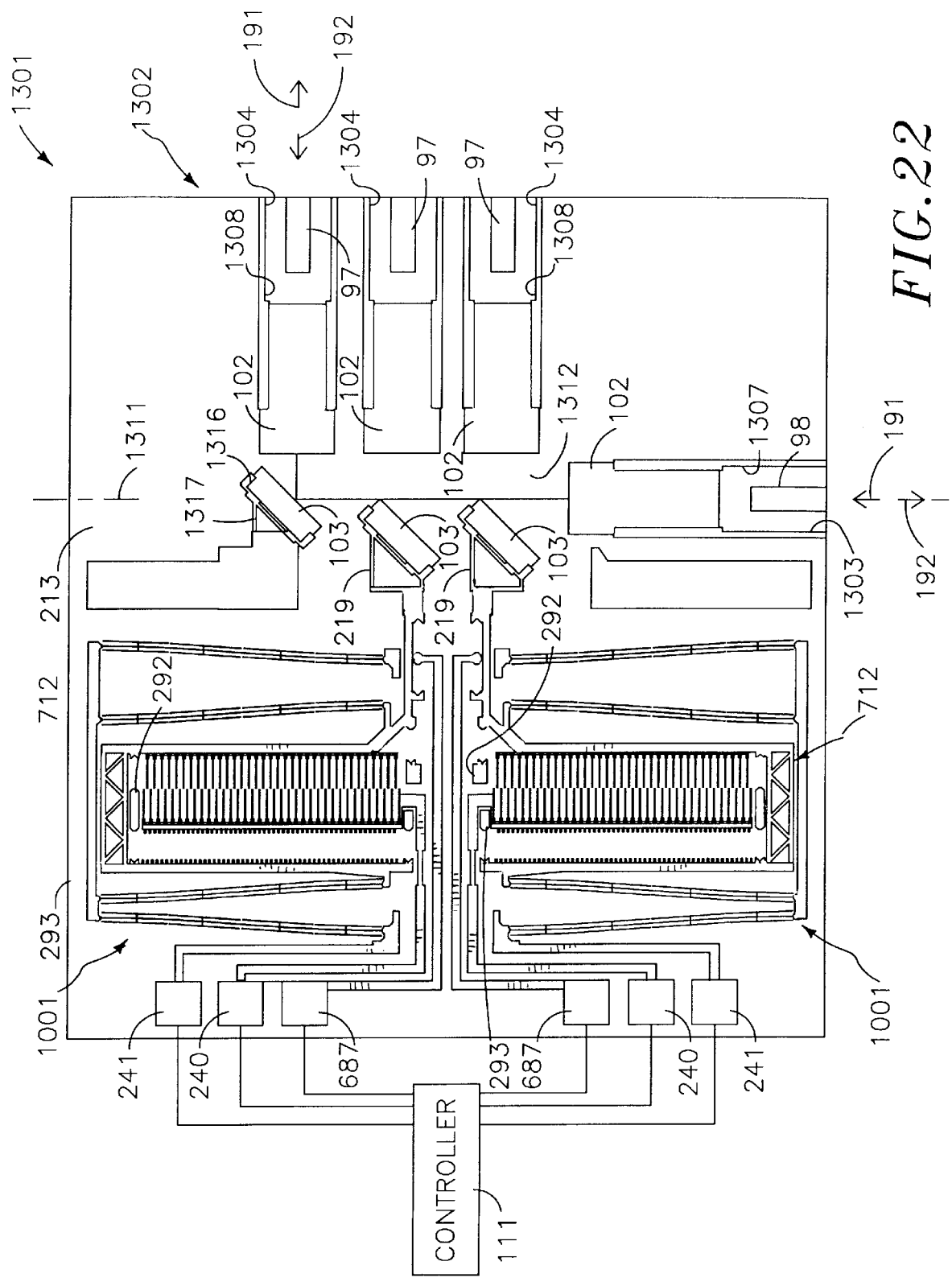
FIG. 22 is a plan view an embodiment of an optical switch utilizing an electrostatic microactuator of the present invention.

An embodiment of an optical switch using an actuator of the present invention is shown schematically in FIG. 22. Optical microswitch 1301 therein is formed from a microchip 1302 having a single input port 1303 coupled to at least one input light carrying element or optical fiber 98 on the microchip 1302. A plurality of three outlet ports 1304 coupled to respective suitable optical elements such as single mode polarization maintaining (PM) optical fibers 97 are provided along one side of the microchip 1302. Only portions of fibers 97,98 are shown in FIG. 22. The microchip 1302 is provided with a channel or groove 1307 opening at input port 1303 for receiving input fiber 98 and a channel or groove 1308 opening on the side of microswitch 1301 at outlet port 1304 for receiving each output fiber 97. A longitudinal axis 1311 extends parallel to inlet port 1303 and perpendicular to outlet ports 1304 along a passageway or hall 1312 of optical switch 1301.

A plurality of two actuators 1001 are disposed in longitudinally spaced-apart position along an imaginary line extending parallel to and spaced-apart from longitudinal axis 1311. First and second actuators 1001 each have a mirror 103 inclined at an angle of 45° relative to longitudinal axis 1311 so as to redirect a suitable input laser beam such as a linearly polarized laser beam 191 provided by inlet fiber 98 through an angle of 90°. Mirror 103 of each actuator 1001 is mounted on a bracket 219 and directs the laser beam forwardly of the actuator 1001 through the respective outlet port 1304 disposed opposite of the actuator 1001 relative to longitudinal axis 1311. Mirrors 103 are each movable by a shuttle 712 of the respective actuator 1001 between a first or retracted position in which the mirror 103 is out of the path of laser beam 191 and a second or extended position in which the mirror 103 is in the path of the laser beam 191. Fixed stops 292,293 limit movement of the shuttle 712 to determine the retracted and extended positions of the mirror 103. It should be appreciated that optical switch 830 can be provided with actuators 1001 for directing the laser beam 191 back toward the actuator and be within the scope of the present invention.

A mirror 1316 substantially similar to mirror 103 is rigidly mounted to microchip 1302 by a bracket 1317 at the top of hall 1312 behind the mirrors 103 of first and second actuators 1001. Mirror 1316 operates in substantially the same manner as mirrors 103 and serves to deflect the laser beam 191 through the third output port 1304 when mirrors 103 of first and second actuators 1001 are each in a retracted position. A suitable lens such as a conventional miniature graded index collimating lens 102 is disposed at the inside of input port 1303 and a lens 102 is disposed between each mirror 103,1316 and the inlet of the respective groove 1303. Microswitch 1301 and actuators 1001 thereof are formed from a silicon wafer having a substrate 213 in the same manner discussed above with respect to the actuators herein.

Although optical microswitch 1301 has been described as utilizing two electrostatic microactuators 1001, it should be appreciated that a microswitch having less than two or more than two microactuators of the type described herein or otherwise can be provided and be within the scope of the present invention.

As can be seen from the foregoing, electrostatic microactuators have been provided which utilize at least one comb drive assembly. Side instability forces in the comb drive assembly are minimized and the resonant characteristics of the comb drive assembly are utilized to achieve large deflections. The electrostatic microactuators herein can be used in devices such as optical microswitches of the type disclosed in copending U.S. patent application Ser. No. 09/135,236 filed Aug. 17, 1998 (A-66163). Such optical switches can be used in suitable systems such as magneto-optical data storage systems, telecommunication systems or network systems.

While the present invention has been described herein with reference to specific embodiments and in a comb drive actuator for use with an optical switch or otherwise, the invention is broad enough to include embodiments having a latitude of modifications, changes and substitutions from the foregoing disclosure. Features of certain embodiments can be combined with other embodiments and be within the scope of the invention. It will also be appreciated that the comb drive assemblies, the clamping electrodes, the stiffening springs and other related components described above, individually or collectively, can be used other than in an actuator.

What is claimed is:

1. An electrostatic microactuator comprising a substrate, at least one comb drive assembly having first and second comb drive members, each of the first and second comb drive members being provided with comb drive fingers, the first comb drive member being mounted on the substrate, first and second spaced-apart, beam-like spring members, the at least one comb drive assembly being disposed between the first and second beam-like spring members, the second comb drive member overlying the substrate, each of the first and second beam-like members having a first end portion secured to the substrate and a second end portion secured to the second comb drive member for suspending the second comb drive member over the substrate, the second comb drive member being movable between a first position in which the comb drive fingers of the first and second comb drive members are spaced apart and a second position in which the comb drive fingers of the first and second comb drive members are interdigitated.

2. An electrostatic microactuator as in claim 1 wherein the first and second beam-like spring members each have a stiffness in a direction perpendicular to the direction of movement of the second comb drive member, each of the first and second beam-like spring members being movable between a first position in which the beam-like spring member is in a nonlinear configuration and occurring when the second comb drive member is in the first position and a second position in which the beam-like spring member is in a linear configuration extending perpendicularly of the direction of movement and occurring when the second comb drive member is in the second position whereby the stiffness of the first and second beam-like spring members in a direction perpendicular to the direction of movement is maximized when the second comb drive member is in the second position.

3. An electrostatic microactuator as in claim 1 wherein the second comb drive member is secured to the substrate solely by the first and second beam-like spring members.

4. An electrostatic microactuator as in claim 1 wherein the second comb drive member is movable under the force of the first and second beam-like spring members from the second position to the first position, the microactuator being free of additional comb drive assemblies having first and second comb drive members with respective comb drive fingers in which the second comb drive member of said additional comb drive assembly is movable to a position in which said comb drive fingers of the additional comb drive assembly are interdigitated when the comb drive fingers of the first-named comb drive assembly are spaced apart.

5. An electrostatic microactuator as in claim 1 further comprising first and second electrostatic clamping electrodes extending perpendicularly of the direction of movement of the second comb drive member, the first and second clamping electrodes being movable between a first position in which the clamping electrodes are spaced apart and occurring when the second comb drive member is in the second position and a second position in which the clamping electrodes are in close proximity to each other and occurring when the second comb drive member is in the first position whereby the clamping electrodes facilitate retention of the second comb drive member in the first position when a voltage potential is applied between the clamping electrodes disposed in the second position in close proximity to each other.

6. An electrostatic microactuator as in claim 1 further comprising an additional comb drive assembly disposed between the first and second beam-like spring members and having first and second comb drive members, each of the first and second comb drive members of the additional comb drive assembly being provided with comb drive fingers, the first comb drive member of the additional comb drive assembly being mounted on the substrate, the second comb drive member of the additional comb drive assembly overlying the substrate and being suspended over the substrate by the first and second beam-like spring members, the second comb drive member of the additional comb drive assembly being movable between a first position in which the comb drive fingers of the first and second comb drive members of the additional comb drive assembly are spaced apart and a second position in which the comb drive fingers of the first and second comb drive members of the additional comb drive assembly are interdigitated, the second comb drive member of the additional comb drive assembly being in the second position when the second comb drive member of the first-named comb drive assembly is in the first position.

7. An electrostatic microactuator as in claim 6 further comprising first and second sets of electrostatic clamping electrodes extending perpendicularly of the direction of movement of the second comb drive members, each of the first and second sets of clamping electrodes having first and second clamping electrodes movable between a first position in which the clamping electrodes are spaced apart and a second position in which the clamping electrodes are in close proximity to each other, the clamping electrodes of the first set being in close proximity to each other when the second comb drive member of the first-named comb drive assembly is in the first position and the clamping electrodes of the second set being in close proximity to each other when the second comb drive member of the additional comb drive assembly is in the first position whereby the clamping electrodes of each set facilitate retention of the second comb drive members in their respective first positions when a voltage potential is applied between said clamping electrodes in the second position in close proximity to each other.

8. An electrostatic microactuator as in claim 1 further comprising a micromotor which is normally closed for locking the second drive member in its first and second positions.

9. An electrostatic microactuator as in claim 1 wherein the comb drive fingers of each of the first and second comb drive members have proximal and distal end portions, each of the proximal end portions having a width and each of the distal end portions having a width which is less than the width of the respective proximal end portion.

10. An electrostatic microactuator as in claim 1 wherein the comb drive fingers of at least one of the first and second comb drive members have varying lengths.

11. An electrostatic microactuator as in claim 1 further comprising travel stop means for limiting the movement of the second comb drive member to the second position whereby the travel stop means facilitates repeatability in the operation of microactuator.

12. An electrostatic microactuator as in claim 11 further comprising a controller and lead means for electrically connecting the travel stop means to the controller whereby the travel stop means permits the controller to monitor when the second comb drive member is in the second position.

13. An electrostatic microactuator as in claim 1 wherein the comb drive fingers of the second comb drive member are movable in a half-stroke from a first position in which the comb drive fingers of the first and second comb drive members are spaced apart to a second position in which said comb drive fingers are partially interdigitated and to a third position in which said comb drive fingers are fully interdigitated, a controller including means for providing a voltage potential between the first and second comb drive members during only a portion of the half-stroke for urging the comb drive fingers of the second comb drive member to the third position.

14. An electrostatic microactuator as in claim 13 wherein the controller includes means for providing a voltage potential between the first and second comb drive members while said comb drive fingers are partially engaged but before said comb drive fingers are fully engaged.

15. An electrostatic actuator as in claim 1 further comprising a mirror and attachment means for coupling the mirror to the at least one comb drive assembly, the attachment means including a bracket member provided with a recess therein, the mirror having a peg portion provided thereon for disposition in the recess to facilitate alignment of the mirror on the bracket member.

16. An electrostatic actuator as in claim 1 further comprising a mirror and attachment means for coupling the mirror to the at least one comb drive assembly, the attachment means including a bracket member provided with a receptacle for receiving the mirror, adhesive means for securing the mirror within the receptacle and a retention member removably mounted on the substrate for retaining the mirror in the receptacle during securement.

17. A method for operating a comb drive assembly having first and second comb drive members with respective comb drive fingers in which the second comb drive member is movable relative to the first comb drive member between a first position in which the comb drive fingers of the first and second comb drive members are spaced apart and a second position in which the comb drive fingers of the first and second comb drive members are interdigitated comprising the steps of oscillating the second comb drive member at resonance to move the second comb drive member to the second position and retaining the second comb drive in the second position.

18. A method as in claim 17 wherein the retaining step includes retaining the second comb drive member in the second position by means of an electrostatic force.

19. A method as in claim 17 wherein the retaining step includes retaining the second comb drive member in the second position by means of a mechanical force.

20. A method as in claim 17 further comprising the step of releasing the second comb drive member from the second position to permit the second comb drive member to move to the first position.

21. An electrostatic microactuator comprising a substrate, at least one comb drive assembly having first and second comb drive members, each of the first and second comb drive members being provided with comb drive fingers, the first comb drive member being mounted on the substrate and the second comb drive member overlying the substrate, and at least one beam-like spring member having a first end portion secured to the substrate and a second end portion secured to the second comb drive member, the second comb drive member being movable in a direction between a first position in which the comb drive fingers of the first and second comb drive members are not substantially fully interdigitated and a second position in which the comb drive fingers of the first and second comb drive members are substantially fully interdigitated, the at least one beam-like spring member having a stiffness in a direction perpendicular to the direction of movement of the second comb drive member and being movable between a first position in which the at least one beam-like spring member is in a nonlinear configuration and occurring when the second comb drive member is in the first position and a second position in which the at least one beam-like spring member is in a linear configuration extending perpendicular to the direction of movement and occurring when the second comb drive member is in the second position whereby the stiffness of the at least one beam-like spring member in a direction perpendicular to the direction of movement increases as the second comb drive member moves from its first position to its second position.

22. An electrostatic microactuator as in claim 21 wherein the second comb drive member is movable in a direction between a first position in which the comb drive fingers of the first and second comb drive members are spaced apart and a second position in which the comb drive fingers of the first and second comb drive members are substantially fully interdigitated.

23. An electrostatic microactuator as in claim 21 further comprising an additional beam-like spring member having a first end portion secured to the substrate and a second end portion secured to the second comb drive member, the additional beam like spring member having a stiffness in a direction perpendicular to the direction of movement of the second comb drive member and being movable between a first position in which the additional beam-like spring member is in a nonlinear configuration and occurring when the second comb drive member is in the first position and a second position in which the additional beam-like spring member is in a linear configuration extending perpendicular to the direction of movement and occurring when the second comb drive member is in the second position.

24. An electrostatic microactuator as in claim 21 further comprising first and second electrostatic clamping electrodes extending perpendicularly of the direction of movement of the second comb drive member, the first and second clamping electrodes being movable between a first position in which the clamping electrodes are spaced apart and occurring when the second comb drive member is in the second position and a second position in which the clamping electrodes are in close proximity to each other and occurring when the second comb drive member is in the first position whereby the clamping electrodes facilitate retention of the second comb drive member in the first position when a voltage potential is applied between the clamping electrodes disposed in the second position in close proximity to each other.

25. An electrostatic microactuator comprising a substrate, at least one comb drive assembly having first and second comb drive members, each of the first and second comb drive members being provided with comb drive fingers, the first comb drive member being mounted on the substrate and the second comb drive member overlying the substrate and being movable in a direction between a first position in which the comb drive fingers of the first and second comb drive members are not substantially fully interdigitated and a second position in which the comb drive fingers of the first and second comb drive members are substantially fully interdigitated, and spring means having a first end portion secured to the substrate and a second end portion secured to the second comb drive member for providing stiffness in a direction perpendicular to the direction of movement of the second comb drive member which increases as the second comb drive member moves from its first position to its second position.

26. An electrostatic microactuator as in claim 25 further comprising means apart from the first and second comb drive members for electrostatically securing the second comb drive member in the first position.

27. An electrostatic microactuator as in claim 26 wherein the means for electrostatically securing the second comb drive member in the first position includes first and second clamping electrodes movable between a first position in which the clamping electrodes are spaced apart and occurring when the second comb drive member is in the second position and a second position in which the clamping electrodes are in close proximity to each other and occurring when the second comb drive member is in the first position.

\* \* \* \* \*